United States Patent
Wu

(10) Patent No.: US 12,556,320 B2
(45) Date of Patent: Feb. 17, 2026

(54) METHOD FOR FEEDING BACK HYBRID AUTOMATIC REPEAT REQUEST ACKNOWLEDGEMENT (HARQ-ACK) AND TERMINAL DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 481 days.

(21) Appl. No.: 18/092,111

(22) Filed: Dec. 30, 2022

(65) Prior Publication Data
US 2023/0231665 A1    Jul. 20, 2023

Related U.S. Application Data

(63) Continuation of application No. PCT/CN2020/101489, filed on Jul. 10, 2020.

(51) Int. Cl.
*H04L 1/1867* (2023.01)
*H04W 72/232* (2023.01)

(52) U.S. Cl.
CPC ......... *H04L 1/1887* (2013.01); *H04W 72/232* (2023.01)

(58) Field of Classification Search
CPC ... H04L 1/1887; H04L 1/1864; H04L 1/1822; H04L 1/1854; H04L 1/1812; H04L 5/0055; H04W 72/232
See application file for complete search history.

(56) References Cited

U.S. PATENT DOCUMENTS

| | | | |
|---|---|---|---|
| 2019/0356430 A1* | 11/2019 | Cheng | H04L 1/1896 |
| 2020/0044783 A1 | 2/2020 | Vaidya et al. | |
| 2020/0044790 A1 | 2/2020 | Vaidya et al. | |
| 2020/0228173 A1* | 7/2020 | Ye | H04L 5/0055 |

(Continued)

FOREIGN PATENT DOCUMENTS

| | | |
|---|---|---|
| CN | 107736049 A | 2/2018 |
| CN | 110178389 A | 8/2019 |

(Continued)

OTHER PUBLICATIONS

Extended European Search Report issued in corresponding European application No. 20944680.6, mailed Aug. 3, 2023.

(Continued)

*Primary Examiner* — Kiet Tang
(74) *Attorney, Agent, or Firm* — BAYES PLLC

(57) ABSTRACT

A method for feeding back a hybrid automatic repeat request acknowledgement (HARQ-ACK) and a terminal device. The method comprises: a terminal device receives a first physical channel transmitted by a network device using a first HARQ process, the first HARQ process corresponding to a disabled state; the terminal device generates a first HARQ-ACK codebook, the first HARQ-ACK codebook comprising a first HARQ-ACK feedback bit corresponding to the first physical channel, or, the first HARQ-ACK codebook comprising no first HARQ-ACK feedback bit corresponding to the first physical channel.

14 Claims, 7 Drawing Sheets

(56) References Cited

U.S. PATENT DOCUMENTS

| | | | | |
|---|---|---|---|---|
| 2020/0351025 A1* | 11/2020 | Choi | ................... | H04L 1/0693 |
| 2020/0367265 A1* | 11/2020 | Wang | ................... | H04L 5/0055 |
| 2022/0240283 A1 | 7/2022 | Hong | | |
| 2022/0287044 A1* | 9/2022 | Yoshioka | .............. | H04L 5/0053 |

FOREIGN PATENT DOCUMENTS

| | | |
|---|---|---|
| CN | 110557233 A | 12/2019 |
| CN | 110830151 A | 2/2020 |
| CN | 111294165 A | 6/2020 |
| EP | 4005128 B1 | 4/2024 |
| WO | 2012099388 A2 | 7/2012 |
| WO | 2019137939 A1 | 7/2019 |
| WO | 2020189932 A1 | 9/2020 |
| WO | 2021024121 A1 | 2/2021 |
| WO | 2021213384 A1 | 10/2021 |

OTHER PUBLICATIONS

Sony, "Discussion on delay-tolerant HARQ for NTN", R1-1912349, 3GPP TSG RAN WG1 Meeting #99 Reno, USA, Nov. 18-22, 2019.

Nokia et al., "Considerations on HARQ in NTN", R1-1913019, 3GPP TSG RAN WG1 Meeting #99 Reno, USA, Nov. 18-22, 2019.

International Search Report issued in International application No. PCT/CN2020/101489, mailed Mar. 29, 2021.

Written Opinion of the International Searching Authority issued in International application No. PCT/CN2020/101489, mailed Mar. 29, 2021.

3GPP TR 38.821 V16.0.0 (Dec. 2019); Technical Specification Group Radio Access Network; Solutions for NR to support non-terrestrial networks (NTN) (Release 16).

ZTE, "Discussion on the enhancement of NTN", R1-2003560, 3GPP TSG RAN WG1 #101 e-Meeting, May 25-Jun. 5, 2020.

First Office Action issued in corresponding European application No. 20944680.6, mailed May 17, 2024.

Priority Review issued in corresponding Chinese application No. 202310562479.7, mailed Jul. 31, 2024.

First Office Action issued in corresponding Chinese application No. 202310562479.7, mailed Aug. 7, 2024.

Source: Panasonic; Title: HARQ and blind retransmission for NTN 3GPP TSG RAN WG1 #98 R1-1908819 Prague, Czech Republic, Aug. 26-30, 2019.

Notice of Grant of Invention Patent Right issued in corresponding Chinese Application No. 202310562479.7, mailed Oct. 30, 2024, 6 pages.

Communication pursuant to Article 94(3) EPC issued in corresponding European Application No. 20944680.6, mailed Nov. 3, 2025, 7 pages.

* cited by examiner

METHOD FOR FEEDING BACK HYBRID AUTOMATIC REPEAT REQUEST ACKNOWLEDGEMENT (HARQ-ACK) AND TERMINAL DEVICE

CROSS REFERENCE

The present application is a continuation of International Application No. PCT/CN2020/101489, filed on Jul. 10, 2020, and the entire contents thereof are incorporated herein by reference.

TECHNICAL FIELD

The embodiment of the present application relates to the communication field, and in particular relates to a hybrid automatic repeat request acknowledgment HARQ-ACK feedback method and a terminal device.

BACKGROUND

In the New Radio (NR) system, the Hybrid Automatic Repeat reQuest (HARQ) mechanism is supported, and HARQ uses the Stop-and-Wait Protocol to send data. In the stop-and-wait protocol, after sending a transport block (TB), the sender stops and waits for confirmation information. In this way, the sender stops and waits for confirmation after each transmission, which will cause the user throughput to be very low. Therefore, the NR system can use multiple parallel HARQ processes. When one HARQ process is waiting for confirmation information, the sender can use another HARQ process to continue sending data.

In the NR system, it is considered to use satellite communication to provide communication services to users. The distance between the satellite orbit and the terminal device is usually relatively long, which leads to a large round-trip transmission time (RTT) therebetween.

SUMMARY

Embodiments of the present application provide a hybrid automatic repeat request response HARQ-ACK feedback method and a terminal device.

In a first aspect, a method for feedbacking HARQ-ACK of hybrid automatic repeat request acknowledgment is provided, including: a terminal device receives a first physical channel transmitted by a network device using a first HARQ process, and the first HARQ process corresponds to a disabled state; the terminal device generates a first HARQ-ACK codebook, the first HARQ-ACK codebook includes the first HARQ-ACK feedback bit corresponding to the first physical channel, or the first HARQ-ACK codebook does not include the first HARQ-ACK feedback bit corresponding to the first physical channel.

In a second aspect, a method for feedbacking HARQ-ACK of hybrid automatic repeat request acknowledgment is provided, including: a terminal device receiving a first physical channel transmitted by a network device using a first HARQ process; and the terminal device generate a first HARQ-ACK codebook according to the status of the first HARQ process.

In a third aspect, a terminal device is provided, configured to execute the method in the foregoing first aspect or any possible implementation manner of the first aspect. Specifically, the terminal device includes a unit configured to execute the method in the foregoing first aspect or any possible implementation manner of the first aspect.

In a fourth aspect, a terminal device is provided, configured to execute the method in the foregoing second aspect or any possible implementation manner of the second aspect. Specifically, the network device includes a unit configured to execute the method in the foregoing second aspect or any possible implementation manner of the second aspect.

According to a fifth aspect, a terminal device is provided, and the terminal device includes: a processor and a memory. The memory is used to store a computer program, and the processor is used to call and run the computer program stored in the memory to execute the method in the above first aspect or its various implementations.

According to a sixth aspect, a terminal device is provided, and the network device includes: a processor and a memory. The memory is used to store a computer program, and the processor is used to call and run the computer program stored in the memory to execute the method in the above second aspect or its various implementations.

In a seventh aspect, a chip is provided for implementing the method of any one of the above first aspect to the second aspect or in each implementation manner thereof.

Specifically, the chip includes: a processor, configured to call and run a computer program from a memory, so that the device installed with the chip executes the method of any one of the above-mentioned first to second aspects or any of the implementations thereof.

In an eighth aspect, there is provided a computer-readable storage medium for storing a computer program, and the computer program causes a computer to execute the method in any one of the above-mentioned first to second aspects or each implementation manner thereof.

In a ninth aspect, a computer program product is provided, including computer program instructions, the computer program instructions causing a computer to execute the method in any one of the above first to second aspects or each implementation manner thereof.

In a tenth aspect, a computer program is provided, which, when running on a computer, causes the computer to execute the method in any one of the above-mentioned first to second aspects or each implementation manner.

DETAILED DESCRIPTION

Figure 1A:
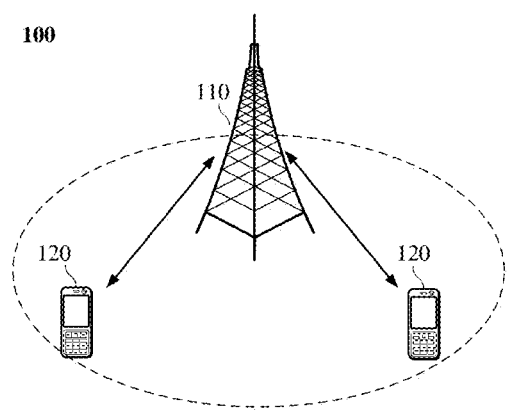
FIG. 1A to FIG. 1C are schematic diagrams of application scenarios applicable to the embodiments of the present application.

Hereinafter, the technical solutions in the embodiments of the present application will be described below with reference to the drawings in the embodiments of the present application. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

The technical solutions of the embodiments of the present application can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

Optionally, the communication system in this embodiment of the application can be applied to a carrier aggregation (CA) scenario, a dual connectivity (DC) scenario, or a standalone (SA) networking scene.

Optionally, the communication system in the embodiment of the present application may be applied to an unlicensed spectrum, wherein the unlicensed spectrum may also be considered as a shared spectrum; or, the communication system in the embodiment of the present application may also be applied to a licensed spectrum, wherein, the licensed spectrum can also be considered as non-shared spectrum.

Optionally, the embodiments of the present application may be applied to a non-terrestrial network (NTN) system, and may also be applied to a terrestrial network (TN) system.

The embodiments of the present application describe various embodiments in conjunction with network device and terminal device, wherein the terminal device may also be referred to as user equipment (UE), access terminal, user unit, user station, mobile station, mobile site, remote station, remote terminal, mobile device, user terminal, terminal, wireless communication device, user agent or user device, etc.

A terminal device can be a station (STATION, ST) in a WLAN, a cellular phone, a cordless phone, a Session Initiation Protocol (SIP) phone, a Wireless Local Loop (WLL) station, a personal digital assistant (PDA) devices, handheld devices with wireless communication functions, computing devices or other processing devices connected to wireless modems, vehicle-mounted devices, wearable devices, terminal device in the next-generation communication systems such as NR networks, or terminal device in future evolved public land mobile network (PLMN) network, etc.

In the embodiment of this application, terminal devices can be deployed on land, including indoor or outdoor, handheld, wearable or vehicle-mounted; they can also be deployed on water (such as ships, etc.); they can also be deployed in the air (such as aircraft, balloons and satellites, etc.).

In this embodiment of the application, the terminal device may be a mobile phone (Mobile Phone), a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home. The terminal device involved in the embodiments of the present application may also be referred to as terminal, user equipment (UE), access terminal device, vehicle-mounted terminal, industrial control terminal, UE unit, UE station, mobile station, mobile site, remote station, remote terminal device, mobile equipment, UE terminal device, wireless communication equipment, UE agent or UE device, etc. The terminal device can also be fixed or mobile.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network or the network device in the NTN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

Exemplarily, FIG. 1A is a schematic structural diagram of a communication system provided by an embodiment of the present application. As shown in FIG. 1A, a communication system 100 may include a network device 110, and the network device 110 may be a device that communicates with a terminal device 120 (or referred to as a communication terminal, terminal). The network device 110 can provide communication coverage for a specific geographical area, and can communicate with terminal devices located in the coverage area.

FIG. 1A exemplarily shows one network device and two terminal devices. Optionally, the communication system 100 may include multiple network devices and each network device may include other numbers of terminal devices within the coverage area, which is not limited in the embodiments of this application.

Figure 1B:
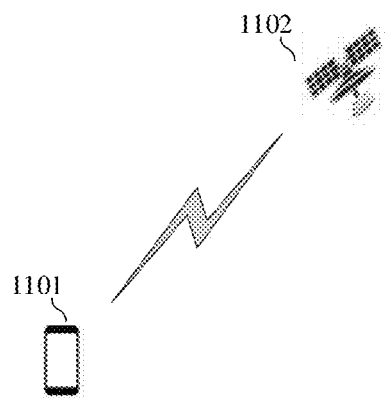

Exemplarily, FIG. 1B is a schematic structural diagram of another communication system provided by an embodiment of the present application. Referring to FIG. 1B, a terminal device 1101 and a satellite 1102 are included, and wireless communication can be performed between the terminal device 1101 and the satellite 1102. The network formed between the terminal device 1101 and the satellite 1102 may also be referred to as NTN. In the architecture of the communication system shown in FIG. 1B, the satellite 1102 may function as a base station, and the terminal device 1101 and the satellite 1102 may communicate directly. Under the system architecture, the satellite 1102 can be referred to as a network device. Optionally, the communication system may include multiple network devices 1102, and the coverage of each network device 1102 may include other numbers of terminal devices, which is not limited in this embodiment of the present application.

Figure 1C:
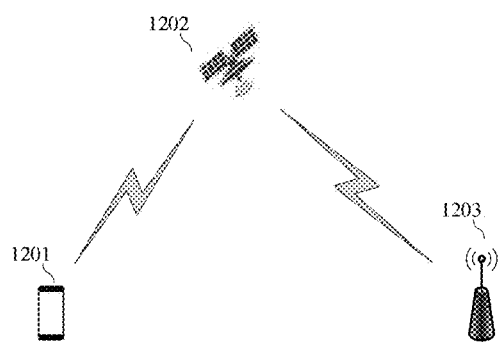

Exemplarily, FIG. 1C is a schematic structural diagram of another communication system provided by an embodiment of the present application. Referring to FIG. 1C, it includes a terminal device 1201, a satellite 1202 and a base station 1203, wireless communication can be performed between the terminal device 1201 and the satellite 1202, and communication can be performed between the satellite 1202 and the base station 1203. The network formed among the terminal device 1201, the satellite 1202 and the base station 1203 may also be referred to as NTN. In the architecture of the communication system shown in FIG. 1C, the satellite 1202 may not have the function of a base station, and the communication between the terminal device 1201 and the base station 1203 needs to be relayed through the satellite 1202. Under this system architecture, the base station 1203 may be called a network device. Optionally, the communication system may include multiple network devices 1203, and the coverage of each network device 1203 may include other numbers of terminal devices, which is not limited in this embodiment of the present application.

It should be noted that FIG. 1A-FIG. 1C are only illustrations of the systems to which this application is applicable. Of course, the methods shown in the embodiments of this application can also be applied to other systems, for example, 5G communication systems, LTE communication systems, etc., which is not specifically limited in this embodiment of the present application.

Optionally, the wireless communication system shown in FIG. 1A-FIG. 1C may further include other network entities such as a mobility management entity (MME), an access and mobility management function (AMF), etc., which is not limited in this embodiment of the present application.

It should be understood that a device with a communication function in the network/system in the embodiment of the present application may be referred to as a communication device. Taking the communication system 100 shown in FIG. 1A as an example, the communication equipment may include a network device 110 and a terminal device 120 with communication functions, and the network device 110 and the terminal device 120 may be the specific equipment described above, which will not be repeated here. The communication device may also include other devices in the communication system 100, such as network controllers, mobility management entities and other network entities, which are not limited in this embodiment of the present application.

It should be understood that the terms "system" and "network" are often used interchangeably herein. The term "and/or" in this article is just an association relationship describing associated objects, which means that there can be three relationships, for example, A and/or B can mean these three situations: A exists alone, A and B exist simultaneously, and B exists alone. In addition, the character "/" in this article generally indicates that the contextual objects are an "or" relationship.

It should be understood that the "indication" mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association relation between A and B.

In the description of the embodiments of the present application, the term "corresponding" may indicate that there is a direct or indirect correspondence between the two, or that there is an association between the two, or the relation such as indicating and being indicated, and configuration and being configured, etc.

Optionally, the indication information in this embodiment of the present application includes physical layer signaling such as at least one of downlink control information (DCI), radio resource control (RRC) signaling, and media access control control element (MAC CE).

Optionally, the high-level parameters or high-level signaling in this embodiment of the present application include at least one of radio resource control (RRC) signaling and media access control element (MAC CE).

To facilitate a better understanding of the embodiments of the present application, the HARQ mechanism and the HARQ-ACK feedback mechanism related to the present application are described first.

HARQ Mechanism in NR System

There are two levels of retransmission mechanisms in the NR system: the Hybrid Automatic Repeat reQuest (HARQ) mechanism of the Media Access Control (MAC) layer and the Automatic Repeat reQuest (ARQ) mechanism of the Radio Link Control (RLC) mechanism Layer. The retransmission of lost or erroneous data is mainly handled by the HARQ mechanism of the MAC layer and supplemented by the retransmission function of the RLC layer. The HARQ mechanism of the MAC layer can provide fast retransmission, and the ARQ mechanism of the RLC layer can provide reliable data transmission.

HARQ uses the Stop-and-Wait Protocol to send data. In the stop-and-wait protocol, after sending a transport block (TB), the sender stops and waits for confirmation information. In this way, the sender stops and waits for an acknowledgment after each transmission, resulting in very low user throughput. Therefore, NR uses multiple parallel HARQ processes. When one HARQ process is waiting for confirmation information, the sender can use another HARQ process to continue sending data. These HARQ processes together form a HARQ entity, which combines a stop-and-wait protocol to allow continuous data transmission. HARQ can be divided into uplink HARQ and downlink HARQ. Uplink HARQ is for uplink data transmission, and downlink HARQ is for downlink data transmission. The two are independent of each other.

In some cases, the terminal device has its own HARQ entity corresponding to each serving cell. Each HARQ entity maintains a set of parallel downlink HARQ processes and a set of parallel uplink HARQ processes. As an example, each uplink and downlink carrier supports a maximum of 16 HARQ processes. The network device may indicate the maximum number of HARQ processes to the terminal device through semi-static configuration of radio resource control (RRC) signaling according to the deployment of the network device. Optionally, in some embodiments, if the network device does not provide corresponding configuration parameters, the default number of HARQ processes in the downlink is 8, and the maximum number of HARQ processes supported by each carrier in the uplink is always 16. Each HARQ process corresponds to a HARQ process ID. For downlink, a broadcast control channel (BCCH) uses a dedicated broadcast HARQ process. For uplink, message 3 (Msg3) transmission in random process uses HARQ ID 0.

In some embodiments, for a terminal device that does not support downlink space division multiplexing, each downlink HARQ process can only process 1 TB at the same time; for a terminal device that supports downlink space division multiplexing, each downlink HARQ process can process simultaneously 1 or 2 TBs. Each uplink HARQ process of the terminal device processes 1 TB at the same time.

HARQ is classified into synchronous and asynchronous in the time domain, and classified into non-adaptive and adaptive in the frequency domain. Both uplink and downlink of NR use asynchronous adaptive HARQ mechanism. For asynchronous HARQ, the time interval between the retransmission of the same TB and the previous transmission is not fixed. Adaptive HARQ can change the frequency domain resources and MCS used for retransmission.

Figure 2:
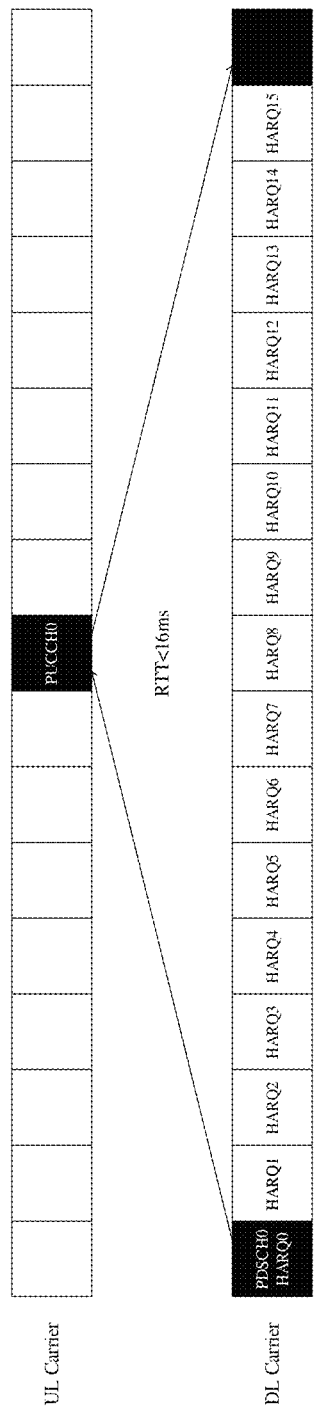
FIG. 2 is a schematic diagram of a relationship between the number of HARQ processes and RTT.

In combination with FIG. 2, the relationship between the number of supported HARQ processes and RTT is described by taking downlink transmission as an example. As shown in FIG. 2, the maximum number of HARQ processes configured for a terminal device is 16, so when the RTT is small, for example, less than 16 ms, the maximum throughput of the terminal device will not be affected, or in other words, if the RTT is less than 16 ms, the maximum throughput of the terminal device will not be affected. When there is service to be transmitted, the terminal device can always have parallel HARQ processes for data transmission. Of course, if the RTT is relatively large, such as much greater than 16 ms, then all HARQ processes of the terminal device may be used for data transmission, and no feedback from the network device is obtained, resulting in the situation that the terminal device has services to be transmitted but no HARQ process can be used, which will further affect the throughput of data transmission on the terminal device side.

HARQ-ACK Feedback in NR System

For a terminal device with downlink services, the network device can schedule transmission of a physical downlink shared channel (PDSCH) for the terminal device through downlink control information (DCI). Wherein, the DCI includes indication information of physical uplink control channel (PUCCH) resources. After the terminal device receives the PDSCH, the decoding result of the PDSCH (Acknowledge (ACK) information or Negative Acknowledge, NACK) information) is fed back to the network device through the PUCCH resource. Wherein, the NR system supports dynamic determination of the HARQ feedback timing. The network device schedules the terminal device to receive the PDSCH through the DCI, wherein the DCI includes indication information of an uplink feedback resource such as a PUCCH resource used to transmit the HARQ-ACK corresponding to the PDSCH.

As an example, the instructions may include:

PUCCH resource indicator: used to determine the PUCCH resource; and

HARQ feedback timing indicator information (e.g., PDSCH-to-HARQ_feedback timing indicator): used to dynamically determine the time domain position of uplink feedback resources, such as the time slot of PUCCH resources used for HARQ feedback, usually represented by K1.

Wherein, the HARQ feedback timing indication information is used to indicate the values in the HARQ feedback timing set. The HARQ feedback timing set may be preset or configured by the network device. As an example, the HARQ feedback timing indication information includes 3 bits. When the HARQ feedback timing indication information is 000, it indicates the first value in the HARQ feedback timing set. When the HARQ feedback timing indication information is 001, it indicates the second value in the HARQ feedback timing set, and so on.

When the terminal device performs HARQ-ACK feedback, it includes semi-static codebook feedback and dynamic codebook feedback. If the terminal device is configured with dynamic codebook feedback, the DCI format for scheduling PDSCH includes the Downlink assignment index (DAI) information field:

DAI count (counter DAI, C-DAI) information, the C-DAI information is used to determine the ranking of the DL transmission scheduled by the current DCI in the downlink transmissions within the HARQ feedback window, wherein the C-DAI information is sorted according to the order of the PDCCH detection opportunities.

Optionally, if it is a carrier aggregation scenario, the DCI may also include:

Total DAI (T-DAI) information, where the T-DAI information is used to determine how many downlink transmissions are included in the HARQ feedback window up to the current DCI scheduling.

Wherein, the HARQ feedback window may be determined according to the HARQ feedback timing set or the HARQ feedback timing indication information. With the evolution of the standard, the HARQ feedback timing indication information may indicate invalid values as well as valid values. When the HARQ feedback timing indication information indicates an invalid value, it may indicate that the time domain position of the uplink feedback resource used to feed back the HARQ-ACK information is temporarily uncertain.

According to the above information, the terminal device can determine information such as the HARQ-ACK feedback codebook corresponding to the downlink transmission, the PUCCH resource used to feed back the HARQ-ACK information, and the time slot for feeding back the HARQ-ACK information.

Figure 3:
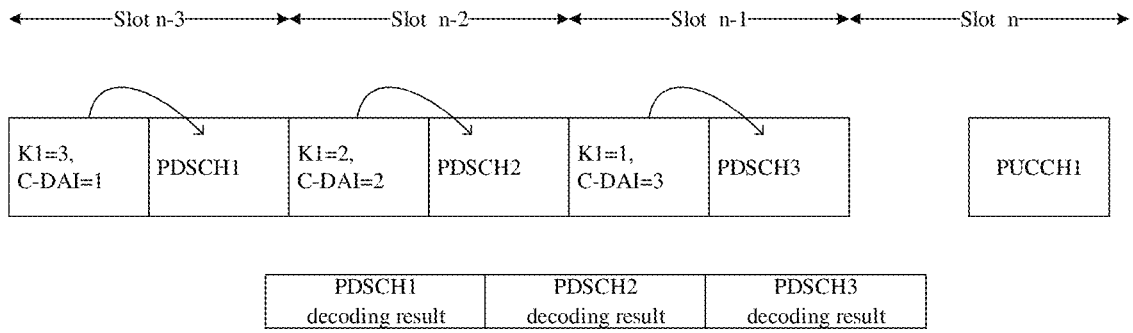
FIG. 3 is a schematic diagram of a HARQ-ACK feedback manner.

FIG. 3 gives an example. As shown in FIG. 3, if K1 in the DCI received by the terminal device on slot n-3 is 3 and C-DAI=1 and the DCI schedules PDSCH1; K1 in the DCI received on slot n-2 is 2 and C-DAI-2 and the DCI schedules PDSCH2; K1 in the DCI received on time slot n-1 is 1 and C-DAI=3 and the DCI schedules PDSCH3. That is, the HARQ feedback timing indication information K1 included in the above DCIs all indicates that the feedback time unit is time slot n.

Normally, one PDSCH can transmit at most two transport block TBs, where in the case of configuring code block group (CBG) feedback, one TB can include one or more CBGs. One TB or one CBG corresponds to 1 bit of HARQ-ACK feedback information, therefore, one PDSCH can correspond to one HARQ feedback bit group. The size K of the HARQ feedback bit group may be determined according to higher layer parameters.

For example, in the case of supporting CBG-based feedback, if the high-level parameters configure PDSCH to transmit up to 2 TBs, and each TB can include up to N CBGs, then a HARQ feedback bit group includes K=2*N HARQ-ACK feedback bits. The arrangement order of the feedback bit may be, for example, {TB0 CBG0, TB0 CBG1, TB0 CBG2, . . . , TB0 CBG N-1, TB1 CBG0, TB1 CBG1, TB1 CBG2, . . . , TB1 CBG N-1}.

For another example, if the CBG-based feedback is not supported, if the upper layer configures the PDSCH to transmit up to 2 TBs, then one HARQ feedback bit group includes K=2 HARQ-ACK feedback bits.

For another example, if the CBG-based feedback is not supported, if the upper layer configures the PDSCH to transmit at most 1 TB, then one HARQ feedback bit group includes K=1 HARQ-ACK feedback bit.

Assuming that the HARQ-ACK information feedback on the cell is based on TB feedback, where the maximum number of TB included in a HARQ process is 1, then a HARQ feedback bit group includes 1 bit of HARQ-ACK information, or a HARQ process corresponds to 1-bit HARQ-ACK information.

When the terminal device generates the HARQ-ACK codebook to be transmitted on slot n (or PUCCH1), the HARQ-ACK codebook may include 3-bit HARQ-ACK information, wherein each 1-bit HARQ-ACK information corresponds to the decoding result of a PDSCH, as shown in FIG. 3.

In the NTN system, because the communication distance between the terminal device and the satellite (or network device) is very long, the RTT of signal transmission is very large. In the GEO system, the RTT of signal transmission may be on the order of hundreds of milliseconds, for example, the maximum RTT of signal transmission may be about 600 ms. In the LEO system, the RTT of signal transmission can be on the order of tens of milliseconds. Since the RTT of the NTN system is much greater than the RTT of the ground communication system, the HARQ mechanism in the NR system is no longer applicable to the NTN system.

as a Solution: Configure the HARQ Process to Disable

The network device may disable at least one downlink HARQ process of the terminal device. For the downlink HARQ process configured to be disabled, the network device can reuse the HARQ process for data transmission without receiving the corresponding HARQ-ACK information fed back by the terminal device for the TB transmitted in the HARQ process. Therefore, the network device can use the disabled HARQ process to schedule multiple data packets for the terminal device, thereby reducing the impact of the RTT.

as Another Solution: Increase the Number of HARQ Processes

Within the range allowed by the capability of the terminal device, the number of HARQ processes configured by the network device for the terminal device may exceed the maximum number of HARQ processes supported by the NR system. For example, the number of HARQ processes configured by the network device for the terminal device may exceed 16. The increase in the number of HARQ processes indicates that the data packets that can be transmitted in parallel between the network device and the terminal device increase, thereby reducing the impact of the RTT.

For the downlink data transmission of the terminal device, when the network device instructs the terminal device to disable the HARQ-ACK feedback of at least one downlink HARQ process. In this case, when the terminal device is configured with dynamic codebook feedback, how to generate a corresponding dynamic codebook for the received downlink data transmission is an urgent problem to be solved.

Figure 4:
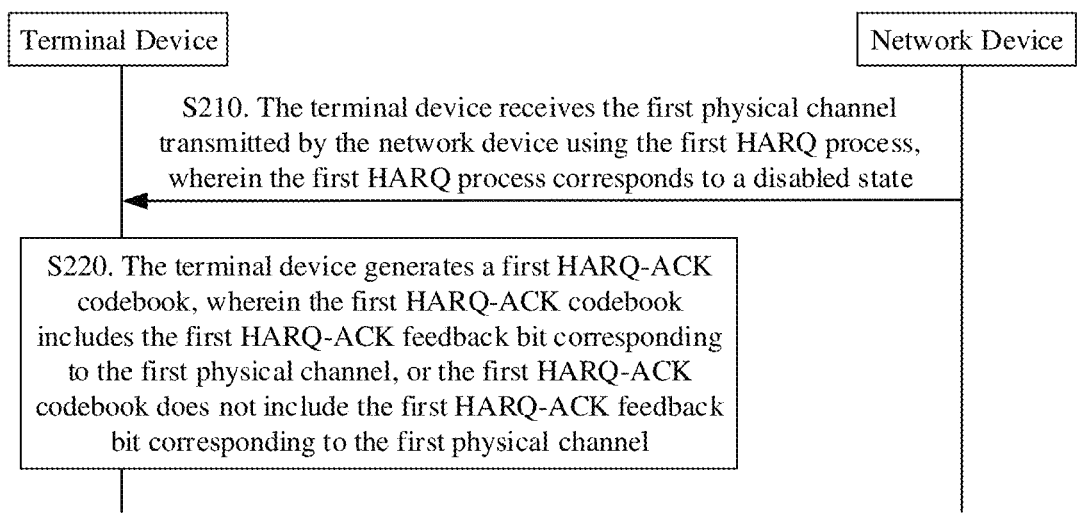
FIG. 4 is a schematic diagram of a hybrid automatic repeat request acknowledgment HARQ-ACK feedback method provided by an embodiment of the present application.

FIG. 4 is a schematic flowchart of a HARQ-ACK feedback method 200 provided by an embodiment of the present application. The method 200 may be performed by a terminal device in the communication system shown in FIG. 1A to FIG. 1C. As shown in FIG. 4, the method 200 may include at least part of the following:

S210. The terminal device receives the first physical channel transmitted by the network device using the first HARQ process, wherein the first HARQ process corresponds to a disabled state;

S220. The terminal device generates a first HARQ-ACK codebook, wherein the first HARQ-ACK codebook includes the first HARQ-ACK feedback bit corresponding to the first physical channel, or the first HARQ-ACK codebook does not include the first HARQ-ACK feedback bit corresponding to the first physical channel.

It should be understood that the embodiment of the present application can be applied to a scenario with a large RTT, such as an NTN scenario, or can also be applied to other scenarios where a relatively large throughput is expected to be achieved through a small number of HARQ processes, and the present application is not limited thereto.

It should be noted that, in other embodiments of the present application, the impact of RTT can also be reduced by configuring a larger number of HARQ processes for the terminal device, and the maximum number of HARQ processes specifically configured can be determined according to the size of the RTT, which is not limited in this application.

In the embodiment of the present application, the HARQ process and the HARQ process number have an associated relationship. In some implementations, the HARQ process can be configured to be enabled or disabled by configuring the HARQ process number as enabled or disabled state. In some other implementation manners, the HARQ process may be configured to be in an enabled state or a disabled state by configuring the number of HARQ processes as the enabled state or the disabled state. In other words, the HARQ process corresponding to the enabled state or the disabled state can also be expressed as the HARQ process being configured as the enabled state or the disabled state.

From the perspective of HARQ-ACK feedback, the enabled state or disabled state corresponding to the HARQ process can also be expressed as the HARQ feedback function state corresponding to the HARQ process being enabled or disabled. In other words, the state of the HARQ feedback function corresponding to the HARQ process is configured as enabled or disabled.

In this embodiment of the present application, the disabled state is also referred to as a non-enabled state.

It should be understood that, in the embodiments of the present application, unless otherwise specified, the HARQ process refers to the downlink HARQ process.

In this embodiment of the present application, the state of the HARQ process may include an enabled state and a disabled state. Optionally, with the evolution of the standard, more states may also be included, such as a semi-enabled state, and the present application is not limited thereto.

Optionally, in some embodiments, the state of the HARQ process may be configured by high-level signaling, or may also be dynamically indicated through dynamic signaling, such as DCI, or may also be implicitly determined. The present application does not limit the configuration manner of the state of the HARQ process.

As an example, the network device may configure part or all of the downlink HARQ processes of the terminal device to an enabled state or a disabled state through the indication information in the DCI, or the network device may configure the HARQ feedback function states corresponding part or all of the downlink HARQ processes of the terminal device to an enabled state or a disabled state through the indication information.

That is to say, the terminal device may be configured by the network device that at least one HARQ process corresponds to a disabled state. Alternatively, the terminal device may also be configured by the network device that at least one HARQ process corresponds to an enabled state.

Optionally, in this embodiment of the present application, states of different HARQ processes may correspond to corresponding HARQ mechanisms and HARQ-ACK feedback mechanisms, so as to meet requirements of different scenarios.

For the HARQ process corresponding to enable state:

As an implementation, for a terminal device, feedback is required, and for a network device, it is expected to receive feedback from the terminal device.

For the HARQ process corresponding to the disabled state:

As an implementation, for the terminal device, feedback is required, and for the network device, it is expected to receive feedback from the terminal device;

As another implementation, for the terminal device, no feedback is required, and for the network device, it is not expected to receive feedback from the terminal device.

As yet another implementation, for the terminal device, feedback is given in a specific situation, and for the network device, feedback is received in a specific situation.

As yet another implementation, for the terminal device, the HARQ process is used to receive the downlink transmission again under certain conditions, and for the network device, the downlink transmission is again scheduled for the HARQ process under certain conditions.

In the following, the HARQ mechanism and the HARQ-ACK mechanism respectively the HARQ process corresponding to the disabled state and the HARQ process corresponding to the enabled state will be described with reference to specific examples.

As an example but not a limitation, the HARQ process corresponding to a disabled state, includes at least one of the following situations:

After the terminal device receives the downlink transmission through the HARQ process, it does not need to send the HARQ-ACK information corresponding to the downlink transmission to the network device;

After the network device sends downlink transmission to the terminal device through the HARQ process, it does not expect to receive the HARQ-ACK information corresponding to the downlink transmission sent by the terminal device;

After the terminal device receives the downlink transmission through the HARQ process, it does not need to feed back the HARQ-ACK information corresponding to the downlink transmission according to the DCI scheduling the downlink transmission;

After the network device sends downlink transmission to the terminal device through the HARQ process, it does not expect to receive the HARQ-ACK information corresponding to the downlink transmission according to the DCI scheduling the downlink transmission;

After the terminal device receives the downlink transmission through the HARQ process, it needs to send the HARQ-ACK information corresponding to the downlink transmission to the network device;

After the network device sends downlink transmission to the terminal device through the HARQ process, it expects to receive the HARQ-ACK information corresponding to the downlink transmission sent by the terminal device;

After the terminal device receives the downlink transmission through the HARQ process, before sending the HARQ-ACK information corresponding to the downlink transmission to the network device, the terminal device can receive the downlink transmission scheduled using the HARQ process again; in other words, there is no need to limit the terminal device to receive the downlink transmission scheduled using the HARQ process again after sending the HARQ-ACK information corresponding to the downlink transmission to the network device;

After the network device schedules the terminal device to receive the downlink transmission through the HARQ process, before receiving the HARQ-ACK information corresponding to the downlink transmission sent by the terminal device, the HARQ process can be used again to schedule the terminal device to receive the downlink transmission; in other words, there is no need to limit the network device to use the HARQ process to schedule the terminal device to receive the downlink transmission again after receiving the HARQ-ACK information corresponding to the downlink transmission sent by the terminal device;

After the terminal device receives the downlink transmission of the network device through the HARQ process, it can receive the downlink transmission scheduled by the network device using the HARQ process again within the first duration;

After the network device schedules the terminal device to receive the downlink transmission through the HARQ process, it can use the HARQ process again to schedule the terminal device to receive the downlink transmission within the first duration.

For the case where it is not necessary to feed back the HARQ-ACK information corresponding to the downlink transmission according to the DCI scheduling the downlink transmission, further, the terminal device may feedback the HARQ-ACK information corresponding to the downlink transmission according to the DCI received after the DCI scheduling the downlink transmission. Correspondingly, for the network device, the HARQ-ACK information corresponding to the downlink transmission may be received according to the DCI sent after the DCI for scheduling the downlink transmission.

Optionally, in some embodiments, the first duration may be determined according to the RTT length between the terminal device and the network device, or the first duration may also be determined according to the position of the uplink feedback resource corresponding to the downlink transmission.

The first duration here and before receiving the HARQ-ACK information corresponding to the downlink transmission sent by the terminal device may correspond to the specific conditions mentioned above, that is, the network device can use again (or, reuse) HARQ process for data transmission under the specific conditions, or in other words, the network device can use a disabled HARQ process to schedule downlink transmission under certain conditions, which is beneficial to reduce the impact of RTT on the HARQ mechanism.

Within the first duration, the network device may consider that the HARQ-ACK information sent by the terminal device has not arrived. Therefore, for the downlink HARQ process corresponding to the disabled state, it is beneficial to improve system performance by using the downlink HARQ process to schedule the terminal device to receive downlink transmission again.

It should be understood that, in this embodiment of the present application, the network device again uses the HARQ process to schedule the terminal device to receive downlink transmission, including:

The network device uses the HARQ process to schedule a new transmission of the transport block in the downlink transmission; or, The network device uses the HARQ process to schedule the retransmission of the transport block in the downlink transmission.

For example, after receiving the first transport block sent by the network device through the first HARQ process corresponding to the disabled state, the terminal device needs to send the HARQ-ACK information corresponding to the first transport block to the network device after a first duration. Within the first duration, the terminal device may also receive a second transport block sent by the network device through the first HARQ process. Wherein, the second transmission block and the first transmission block may be different transmission blocks, or may be the same transmission block. If the second transport block and the first transport block are different transport blocks, it means that the network device uses the first HARQ process to schedule a new transmission of the transport block in the downlink transmission. If the second transport block and the first transport block are the same transport block, it means that the network device uses the first HARQ process to schedule retransmission of the transport block in the downlink transmission.

In some cases, for example, when the network device uses the HARQ process to schedule a new transmission of a transport block in the downlink transmission, reusing the HARQ process to schedule the terminal device to receive the downlink transmission is independent of using the HARQ process to schedule the terminal device to receive the downlink transmission. That is to say, there may be no correlation between the two data transmissions, and correspondingly, on the terminal device side, the data received in the two transmissions may be independently decoded.

In some embodiments of the present application, for a HARQ process corresponding to a disabled state, after receiving a downlink transmission such as a downlink transmission block through the HARQ process, the terminal device needs to send the HARQ-ACK information corresponding to the downlink transmission block to the network device. In this way, on the one hand, the HARQ process can be reused by the network device to schedule other downlink transmission blocks of the terminal device, thereby solving the problem that the terminal device has services to be transmitted but no HARQ process can be used. On the other hand, after the network device receives the NACK information corresponding to the downlink transmission block transmitted in the HARQ process, the erroneous downlink transmission block can still be rescheduled through the MAC layer instead of directly retransmitting the RLC layer, thereby reducing the transmission delay of the downlink transmission block.

Optionally, in the foregoing method of rescheduling the erroneous downlink transport block through the MAC layer, the terminal device does not know that the currently received downlink transport block is a retransmission of a previously transmitted downlink transport block when performing physical layer processing, accordingly, the terminal device will treat the received downlink transmission block as a new transmission, or in other words, the terminal device will not perform HARQ combination on the downlink transmission block.

As an example but not a limitation, the HARQ process corresponding to an enabled state, includes at least one of the following situations:

After the terminal device receives the downlink transmission through the HARQ process, it needs to send the HARQ-ACK information corresponding to the downlink transmission to the network device;

After the network device sends downlink transmission to the terminal device through the HARQ process, it expects to receive the HARQ-ACK information corresponding to the downlink transmission sent by the terminal device;

After receiving the downlink transmission through the HARQ process, the terminal device needs to feed back the HARQ-ACK information corresponding to the downlink transmission according to the DCI scheduling the downlink transmission;

After the network device sends the downlink transmission to the terminal device through the HARQ process, it expects to receive the HARQ-ACK information corresponding to the downlink transmission according to the DCI scheduling the downlink transmission;

After receiving the downlink transmission through the HARQ process, the terminal device does not expect to receive the downlink transmission scheduled by the HARQ process again before sending the HARQ-ACK information corresponding to the downlink transmission to the network device; in other words, the downlink transmission scheduled using the HARQ process can be received again only after the network device sends the HARQ-ACK information corresponding to the downlink transmission;

After the network device schedules the downlink transmission of the terminal device through the HARQ process, before receiving the HARQ-ACK information corresponding to the downlink transmission sent by the terminal device, the network device cannot use the HARQ process to schedule the downlink transmission of the terminal device again; in other words, only after receiving the HARQ-ACK information corresponding to the downlink transmission sent by the terminal device, the network device can use the HARQ process to schedule the downlink transmission of the terminal device again;

After the terminal device receives the downlink transmission through the HARQ process, it cannot receive the downlink transmission scheduled by the HARQ process again within the first duration;

After the network device schedules the downlink transmission of the terminal device through the HARQ process, it cannot use the HARQ process again to schedule the downlink transmission of the terminal device within the first duration.

The definition of the first duration may refer to the related description above, which will not be repeated here.

As an example but not a limitation, the downlink transmission includes at least one of the following:
  PDSCH data transmission scheduled by PDCCH, for example, it includes ordinary PDSCH transmission and PDSCH transmission for downlink (DL) Semi-Persistent Scheduling (SPS) activation;
  PDCCH transmission for DL SPS PDSCH release;
  PDCCH transmission for indication of dormancy or non-dormancy behavior for SCells;
  DL SPS PDSCH transmission without corresponding PDCCH scheduling.

Optionally, one downlink transmission includes one transmission of the downlink transmission, or one downlink transmission includes multiple repeated transmissions of the downlink transmission. For example, one PDSCH transmission includes one transmission of TB, or one PDSCH transmission includes multiple repeated transmissions of the TB.

In this embodiment of the present application, the first physical channel is a downlink transmission performed through a first HARQ process in a disabled state. Therefore, the first physical channel may include at least one of the following:
  PDSCH scheduled by PDCCH;
  PDCCH for DL SPS PDSCH release;
  PDCCH used to indicate the sleep or non-sleep behavior of the secondary cell;
  DL SPS PDSCH without corresponding PDCCH scheduling.

Certainly, the downlink transmission may also be other downlink transmission performed by the network device through the HARQ process, and the present application is not limited thereto.

Optionally, in this embodiment of the present application, the HARQ-ACK information corresponding to the downlink transmission may include, but not limited to, ACK information or NACK information corresponding to the decoding result of the downlink transmission such as PDSCH.

Optionally, in this embodiment of the present application, if the downlink transmission includes a PDCCH for DL SPS PDSCH release or a PDCCH for indicating the sleep or non-sleep behavior of the secondary cell, the HARQ-ACK information corresponding to the downlink transmission includes ACK information.

In this embodiment of the present application, after receiving the first physical channel transmitted by the network device using the first HARQ process, the terminal device may further generate the first HARQ-ACK codebook according to the state of the first HARQ process. For example, the first HARQ process corresponds to the disabled state, and the generated first HARQ-ACK codebook may include the first HARQ-ACK feedback bit corresponding to the first physical channel, or the first HARQ-ACK codebook does not include the first HARQ-ACK feedback bit corresponding to the first physical channel. That is to say, for the first physical channel transmitted through the HARQ process in the disabled state, the terminal device may feedback the HARQ-ACK information corresponding to the first physical channel to the network device, or may not feedback the first physical channel HARQ-ACK information corresponding to a physical channel.

It should be noted that, in this embodiment of the present application, the terminal device does not feedback the HARQ-ACK information corresponding to the first physical channel may include the following two situations:

The first HARQ-ACK codebook includes the feedback position of the HARQ-ACK information corresponding to the first physical channel, and the HARQ-ACK feedback position corresponding to the first physical channel in the first HARQ-ACK codebook is occupancy information such as NACK.

The first HARQ-ACK codebook does not include the feedback position of the HARQ-ACK information corresponding to the first physical channel, or in other words, the first HARQ-ACK codebook does not include the HARQ-ACK information corresponding to the first physical channel, nor does it include occupancy information for the HARQ-ACK information, that is, the HARQ-ACK information corresponding to the first physical channel does not occupy any position in the first HARQ-ACK codebook.

In summary, there are the following three feedback methods for downlink transmission using a disabled HARQ process:

Feedback mode 1: the first HARQ-ACK codebook includes the first HARQ-ACK feedback bit corresponding to the first physical channel.

Feedback mode 2: The first HARQ-ACK codebook includes occupancy information of the HARQ-ACK feedback bit corresponding to the first physical channel. The following uses NACK as an example to describe the occupancy information, but the application is not limited thereto.

Feedback mode 3: The first HARQ-ACK codebook does not include any information related to the first HARQ-ACK feedback bit corresponding to the first physical channel, that is, the HARQ-ACK information corresponding to the first physical channel occupies no position in the first HARQ- ACK codebook, or in other words, the HARQ-ACK feedback position corresponding to the first physical channel is not included in the first HARQ-ACK codebook.

Wherein, neither the feedback mode 2 nor the feedback mode 3 includes the substantial HARQ-ACK information corresponding to the first physical channel, and it can be considered that both belong to the case of no feedback.

Optionally, in some embodiments, for downlink transmission performed using a disabled HARQ process, the terminal device performs HARQ-ACK feedback in a fixed feedback manner.

For example, for the downlink physical channels transmitted through the HARQ process in the disabled state, the feedback mode 1 is used for feedback, or the feedback mode 2 is used for feedback, or the feedback mode 3 is used for feedback.

Optionally, in some other embodiments, the terminal device may also use a specific feedback manner to perform HARQ-ACK feedback under specific conditions.

As an example, the first physical channel is scheduled by the first DCI, the first DCI may include first HARQ feedback timing indication information, and the terminal device may feedback in feedback mode 3 when the first HARQ feedback timing indication information indicate an invalid value; or, the terminal device may use feedback mode 1 or feedback mode 2 when the first HARQ feedback timing indication information indicates a valid value.

The first HARQ feedback timing indication information is used to indicate a value in the HARQ feedback timing set. Wherein, the HARQ feedback timing set may include valid values and/or invalid values, and this application does not limit the specific values of the invalid values. As an example, the invalid value is −1.

In some cases, only valid values are included in the HARQ feedback timing set, or in other words, the terminal device may determine the first uplink feedback resource for sending the first HARQ-ACK codebook according to the first HARQ feedback timing indication information.

In other cases, only one valid value is included in the HARQ feedback timing set. In this case, the HARQ feedback timing indication information may not be included in the DCI, and the terminal device may determine the first uplink feedback resource for sending the first HARQ-ACK codebook according to the valid value included in the HARQ feedback timing set.

In other cases, the HARQ feedback timing set includes valid values and invalid values, if the value indicated by the first HARQ feedback timing indication information corresponds to an invalid value in the HARQ feedback timing set or does not correspond to any value, it can be considered that the first HARQ feedback timing indication information indicates an invalid value; on the contrary, if the value indicated by the first HARQ feedback timing indication information corresponds to a valid value in the HARQ feedback timing set, it can be considered that the first HARQ feedback timing indication information indicates a valid value.

As another example, the first DCI may include a first C-DAI, and the first C-DAI is used to indicate the transmission sequence corresponding to the first physical channel, and the terminal device may feedback in feedback mode 3 or feedback mode 2 when the DAI indicates a preset value, in which case it can be regarded as no feedback.

Optionally, the preset value may be, for example, 1, or 4, etc., which is not limited in this application.

As another example, when the first HARQ feedback timing indication information indicates a valid value, the terminal device may use feedback mode 1 to feedback, that is, the first HARQ-ACK codebook includes the first HARQ-ACK feedback bit.

After generating the first HARQ-ACK codebook, further, the terminal device may send the first HARQ-ACK codebook to the network device through the first uplink feedback resource.

It should be noted that since the RTT is very large in the NTN system, it is possible to enhance the uplink transmission timing by introducing an offset parameter such as Koffset. Optionally, the terminal device determines the first uplink feedback resource for sending the first HARQ-ACK codebook according to the first HARQ feedback timing indication information and Koffset. Optionally, the value of Koffset is preset or indicated by the network device through indication information.

Optionally, in some embodiments, the terminal device may determine the first uplink feedback resource according to at least one of: whether the first DCI for scheduling the first physical channel includes the first HARQ feedback timing indication information; the value of the first HARQ feedback timing indication information, the HARQ feedback timing set, and the second HARQ feedback timing indication information. Wherein, the second HARQ feedback timing indication information is included in a second DCI, and the second DCI is used to schedule a second physical channel, wherein the second physical channel is transmitted after the first physical channel, or the second physical downlink control channel PDCCH monitoring opportunity when the terminal device detects the second DCI is later than the first PDCCH monitoring opportunity when the terminal device detects the first DCI.

Case 1: The first DCI includes first HARQ feedback timing indication information, In this case, further, the terminal device may determine the first uplink feedback resource according to a value of the first HARQ feedback timing indication information.

For example, if the value of the first HARQ feedback timing indication information is a valid value, the terminal device may determine the first uplink feedback resource according to the value of the first HARQ feedback timing indication information and the HARQ feedback timing set.

For another example, if the value of the first HARQ feedback timing indication information is an invalid value, the terminal device may determine it according to the second HARQ feedback timing indication information. The specific implementation of determining the first uplink feedback resource according to the second HARQ feedback timing indication information is described below.

Optionally, in this embodiment of the present application, the HARQ feedback timing set may be preset or configured by a network device. When configured by the network device, the network device may configure the HARQ feedback timing set to include only one value.

Optionally, in some embodiments, if the value of the HARQ feedback timing indication information in the DCI is a valid value, the state of the HARQ process corresponding to the physical channel scheduled by the DCI is enabled; or, if the value of the HARQ feedback timing indication information is an invalid value, the state of the HARQ process corresponding to the physical channel scheduled by the DCI is a disabled state.

Case 2: The first DCI does not include the first HARQ feedback timing indication information.

In this case, the terminal device may determine the position of the first uplink feedback resource according to the second HARQ feedback timing indication information or the HARQ feedback timing set.

For example, if there is only one value in the HARQ feedback timing set, in this case, the terminal device may also directly determine the position of the first uplink feedback resource according to one value in the HARQ feedback timing set.

For another example, the terminal device determines the first uplink feedback resource according to the value of the second HARQ feedback timing indication information and the HARQ feedback timing set. Wherein, the value of the second HARQ feedback timing indication information is a valid value, or, the second physical channel is transmitted through an enabled HARQ process.

As an embodiment, the second physical channel includes a physical channel whose corresponding HARQ feedback timing indication information after transmission of the first physical channel is a valid value. As a specific example, the second physical channel includes the first physical channel whose corresponding HARQ feedback timing indication information is a valid value after the transmission of the first physical channel.

Optionally, the fact that the HARQ feedback indication information corresponding to the physical channel is a valid value may be understood as that the HARQ feedback timing indication information included in the DCI used to schedule the physical channel indicates a valid value in the HARQ feedback timing set.

Optionally, the fact that the HARQ feedback indication information corresponding to the physical channel is an invalid value may be understood as that the HARQ feedback timing indication information included in the DCI used to schedule the physical channel indicates an invalid value in the HARQ feedback timing set.

As another embodiment, the second DCI includes a DCI in which corresponding HARQ feedback timing indication information detected by the terminal device after the first DCI is a valid value. As a specific example, the second DCI includes the first one of the DCI detected by the terminal device after the first DCI, and the corresponding HARQ feedback timing indication information is a valid value.

In this embodiment of the present application, the second physical channel may be transmitted through a second HARQ process, and the second HARQ process may correspond to a disabled state or may also correspond to an enabled state. Optionally, the second HARQ process and the first HARQ process may have different HARQ process numbers, or the second HARQ process and the first HARQ process may have the same HARQ process number. That is to say, the terminal device may determine to feed back the HARQ-ACK information corresponding to the first physical channel according to the HARQ feedback timing indication information corresponding to the physical channel transmitted by the HARQ process in the disabled state or enabled state for subsequent transmission.

Preferably, the second HARQ process corresponding to the second physical channel corresponds to the enabled state, and the physical channel transmitted by the HARQ process in the enabled state usually needs to be fed back, and the position of the uplink feedback resource is determined according to the HARQ feedback timing indication information corresponding to the physical channel, which is beneficial to ensure the reliable transmission of the feedback information.

The above describes how to perform feedback on the first physical channel transmitted by the first HARQ process in the disabled state in conjunction with specific embodiments.

Hereinafter, it will be further described how to perform feedback when the terminal device receives the first physical channel transmitted by the first HARQ process in the disabled state, and receives the second physical channel transmitted by the second HARQ process in the enabled state.

It should be noted that, the above embodiment is only described by taking feedback on a physical channel transmitted by one HARQ process in a disabled state as an example. Similarly, the embodiment of the present application can also be applied to the case of performing feedback on the physical channels transmitted by more HARQ processes in the disabled state, the specific implementation manner is similar, and details are not described here.

Similarly, the following embodiments only illustrate how to perform feedback on a physical channel transmitted by one HARQ process in a disabled state and a physical channel transmitted by one HARQ process in an enabled state as an example. Of course, it can also be applied to the scenario of feedback to physical channels transmitted by multiple HARQ processes in the disabled state and the enabled state, the specific implementation methods are similar and will not be described here.

In some embodiments of the present application, when the same HARQ-ACK codebook is generated based on the decoding results corresponding to the physical channel transmitted through the HARQ process in the disabled state and the physical channel transmitted through the HARQ process in the enabled state, the HARQ-ACK codebook may include HARQ-ACK information corresponding to the physical channel transmitted by the HARQ process in the enabled state. Optionally, the HARQ-ACK information corresponding to the physical channel transmitted by the HARQ process in the disabled state may be included, or the HARQ-ACK information corresponding to the physical channel transmitted by the HARQ process in the disabled state may not be included.

That is to say, during unified feedback, the HARQ-ACK information corresponding to the physical channel transmitted by the HARQ process in the disabled state can also be fed back by using the aforementioned three feedback methods.

Optionally, for a manner of determining the uplink feedback resources used for sending the HARQ-ACK codebook, reference may be made to relevant descriptions in the foregoing embodiments, and details are not repeated here.

In the following, the manner of generating the codebook according to the embodiment of the present application will be described in conjunction with specific embodiments.

Optionally, in this embodiment of the present application, the terminal device is configured to feed back a dynamic codebook. The dynamic codebook feedback is, for example, dynamic or type 2 codebook feedback, or enhanced dynamic codebook or enhanced Type2 or eType2 codebook feedback, and the like.

When the terminal device is configured to perform dynamic codebook feedback, for the HARQ-ACK information that needs to be fed back on the same uplink feedback resource, the terminal device can generate dynamic codebook. For the first HARQ-ACK codebook, the terminal device may generate it according to the first C-DAI in the first DCI and/or the second C-DAI in the second DCI. If the first DCI also includes the first T-DAI, and/or, the second DCI also includes the second T-DAI, the terminal device may generate the first HARQ-ACK codebook according to the first C-DAI and/or the first T-DAI in the first DCI, and/or the C-DAI and/or the second T-DAI in the second DCI.

Before introducing the codebook generation method, firstly, an explanation will be made on the counting methods of the C-DAI in the disabled state and the enabled state. The counting methods of the C-DAI in the disabled state and the enabled state include at least one of the following situations.

Counting method 1: joint counting of C-DAI in the disabled state and C-DAI in the enabled state.

In this case, the first C-DAI may be used to indicate the ranking value of the first physical channel in the downlink transmission using the HARQ processes in the disabled state and the enabled state, and the second C-DAI is used to indicate the ranking value of the second physical channel in the downlink transmission performed by using the HARQ processes in the disabled state and the enabled state.

Counting method 2: independent counting of the C-DAI in the disabled state and C-DAI in the enabled state.

In this case, the first C-DAI may be used to indicate the ranking value of the first physical channel in the downlink transmission using the HARQ process in the disabled state, and the second C-DAI is used to indicate the ranking value of the second physical channel in the downlink transmissions using enabled HARQ processes.

Counting method 3: no counting of the C-DAI in the disabled, and counting the C-DAI in the enabled state.

In this case, the first C-DAI included in the first DCI is not used to indicate the ranking value of the first physical channel or the first C-DAI is not included in the first DCI, and the second C-DAI is used to indicate the ranking value of the first physical channel in the downlink transmission performed by using the HARQ process in the enabled state.

Optionally, corresponding to the above three counting methods, if the DCI includes T-DAI, the counting methods for the T-DAI in the disabled state and the enabled state include at least one of the following situations.

Counting method 1: jointly counting of the T-DAI in the disabled state and T-DAI in the enabled state.

In this case, the first T-DAI may be used to indicate the total number of downlink transmissions performed by using the HARQ processes in the disabled state and the enabled state until the first physical channel, and the second T-DAI may be used to indicate the total number of downlink transmissions performed by using the HARQ process in the disabled state and the enabled state until the second physical channel.

Counting method 2: independent counting of the T-DAI in the disabled state and T-DAI in the enabled state.

In this case, the first T-DAI may be used to indicate the total number of downlink transmissions performed by using the HARQ process in the disabled state until the first physical channel, and the second T-DAI is used to indicate the total number of downlink transmissions performed by using the HARQ process in the enabled state until the second physical channel.

Counting method 3: no counting of the T-DAI in the disabled state, and counting the T-DAI in the enabled state.

In this case, the first T-DAI included in the first DCI is not used to indicate the number of downlink transmissions included in the first physical channel or the first T-DAI is not included in the first DCI, and the second T-DAI is used to indicate the total number of downlink transmissions performed by using the HARQ process in the enabled state until the second physical channel.

Optionally, in this embodiment of the present application, the first HARQ-ACK codebook may be generated in multiple ways, and the codebook generation method may or may not be related to the state of the HARQ process used by the physical channel that requires unified feedback, may or may not be related to the counting method of C-DAI, and may or may not be related to the counting method of T-DAI.

The following takes the generation of the HARQ-ACK codebook according to the C-DAI as an example for illustration. It should be understood that, if the DCI includes T-DAI, the method of generating the HARQ-ACK codebook according to the C-DAI and T-DAI is similar to the method of generating the HARQ-ACK codebook according to the C-DAI, which will not be repeated here.

Codebook generation method 1: generating the first HARQ-ACK codebook according to the first C-DAI.

This approach may be applicable to a scenario where all HARQ processes used by physical channels that require unified feedback correspond to a disabled state, or a scenario where there are HARQ processes corresponding to a disabled state and HARQ processes corresponding to an enabled state.

Optionally, the first C-DAI is a ranking value of the first physical channel in downlink transmission using a HARQ process in a disabled state, which corresponds to counting method 2.

Optionally, the first C-DAI is a ranking value of the first physical channel in downlink transmission using HARQ processes in a disabled state and an enabled state, that is to say, the downlink transmissions performed in the HARQ processes in the disabled state and the enabled state are jointly counted, which corresponds to counting method 1.

As described in counting method 3 above, the C-DAT corresponding to the physical channel transmitted by the HARQ process in the disabled state may not be counted, or the DCI for scheduling the physical channel may not include the C-TAI. If the DCI corresponding to the physical channel used to generate the first HARQ-ACK codebook does not include C-TAI, in this case, the first HARQ-ACK codebook may not be generated, that is, no feedback is performed for the physical channel corresponding to HARQ process in the disabled state.

Codebook generation method 2: generating the first HARQ-ACK codebook according to the first C-DAI and the second C-DAI.

Optionally, the first C-DAI is the ranking value of the first physical channel in the downlink transmission using the HARQ processes in the disabled state and the enabled state, and the second C-DAI is the ranking value of the second physical channel in the downlink transmission performed by using the HARQ processes in the disabled state and the enabled state, which corresponds to counting method 1.

Optionally, the first C-DAI is the ranking value of the first physical channel in the downlink transmission using the HARQ process in the disabled state, and the second C-DAI is the ranking value of the second physical channel in the downlink transmissions using the HARQ processes in the enabled state, which corresponds to counting method 2.

Codebook generation method 3: the first HARQ-ACK codebook is generated according to the second C-DAI.

Optionally, the second C-DAI is a ranking value of the second physical channel in downlink transmission using an enabled HARQ process, which corresponds to counting method 2 and counting method 3.

Optionally, in some embodiments, for the case where unified feedback is performed for the downlink transmission using the HARQ process in the disabled state and the enabled state, the terminal device may fixedly use a codebook generation method to generate the codebook, regardless of the counting method of C-DAI, for example, regardless of whether the codebook generation method 3 or codebook generation method 2 is used.

Optionally, in some embodiments, for the case of unified feedback for downlink transmission performed by using the HARQ process in the disabled state and the enabled state, the terminal device may also use an appropriate codebook generation method to generate the codebook according to the C-DAI counting method of the disabled state and the enabled state.

As an example, when counting mode 1 is used, the HARQ-ACK codebook is generated according to codebook generation method 1 or codebook generation method 2.

As yet another example, when counting mode 2 is used, the HARQ-ACK codebook is generated according to codebook generation method 2 or codebook generation method 3.

As yet another example, when counting mode 3 is used, the HARQ-ACK codebook is generated according to codebook generation method 3.

In the embodiment of this application, the counting method of C-DAI and the feedback method mentioned above can be independent or related. For example, according to the counting method of C-DAI, appropriate feedback method may be performed for the downlink transmission performed by the HARQ process in the disabled state.

As an example, when counting method 1, that is, joint counting, is used, the first HARQ-ACK codebook includes the first HARQ-ACK feedback bit, corresponding to feedback mode 1; or, in the first HARQ-ACK codebook, the HARQ-ACK feedback position corresponding to the first physical channel described herein is set to NACK, which corresponds to feedback mode 2.

As another example, when counting method 2, that is, independent counting, is used, the HARQ-ACK feedback position corresponding to the first physical channel in the first HARQ-ACK codebook is NACK, corresponding to feedback mode 2; or the first HARQ-ACK codebook does not include the first HARQ-ACK feedback bit and occupancy information, corresponding to feedback mode 3.

As another example, when the counting method 3 is used, that is, when the scheduling of the HARQ process corresponding to the disabled state is not counted, the first HARQ-ACK codebook does not include the HARQ-ACK feedback position corresponding to the first physical channel, corresponding to feedback method 3.

It should be noted that the specific implementation of the feedback method, counting method, and codebook generation method in the above-mentioned embodiments are only examples, and one or more of them may be used in practical applications, or other implementation methods may also be extended, the present application is not limited thereto. Further, the feedback method, the counting method, and the codebook generation method may be implemented independently or in combination with each other, which is not limited in this application.

Therefore, in some embodiments of the present application, when a terminal device is configured with one or more HARQ processes corresponding to the disabled state, the terminal device can still generate a dynamic codebook, thereby avoiding ambiguous understanding of the HARQ-ACK feedback codebook between the network device and the terminal device. In addition, HARQ-ACK information is still fed back to the HARQ process in the disabled state. When the network device receives the NACK corresponding to the HARQ process in the disabled state, the network device can reschedule the data packet in the HARQ process by rescheduling new transmission through DCI, instead of performing ARQ retransmission mechanism of the RLC layer, thereby reducing the transmission delay of the data packet.

Hereinafter, the HARQ-ACK feedback method in the embodiment of the present application will be described with reference to the specific examples shown in FIG. 5 to FIG. 9.

Embodiment 1

In Embodiment 1, the HARQ process 0 of the terminal device corresponds to a disabled state. If the terminal device receives the downlink physical channel transmitted by the network device using the HARQ process 0 in the disabled state, the terminal device should send the HARQ-ACK feedback bit corresponding to the downlink physical channel.

Example 1-1

Figure 5:
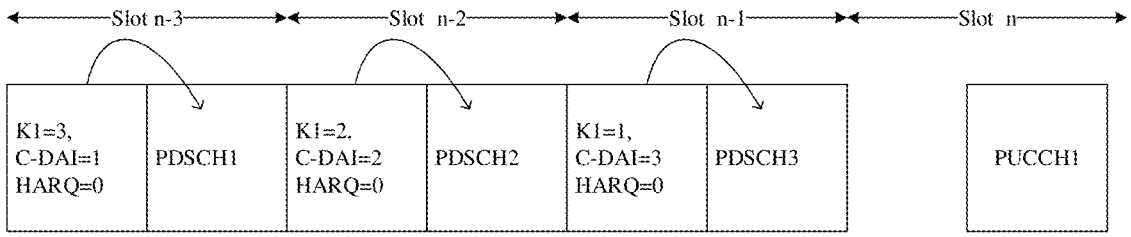
FIG. 5 to FIG. 9 are typical examples of HARQ-ACK feedback methods according to the embodiments of the present application.

As shown in FIG. 5, if K1 in the DCI received by the terminal device on time slot n-3 is 3, C-DAI=1, and the DCI schedules PDSCH1 transmitted using HARQ process 0; K1 in the DCI received on time slot n-2 is 2, C-DAI=2, and the DCI schedules PDSCH2 transmitted using HARQ process 0; K1 in the DCI received on time slot n-1 is 1, C-DAI=3, and the DCI schedules PDSCH3 transmitted by HARQ process 0. Each HARQ feedback timing indication information K1 included in the above DCIs indicates that the feedback time unit is time slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

Then when the terminal device generates the HARQ-ACK codebook to be transmitted on slot n (or PUCCH1), the HARQ-ACK codebook includes the following 3-bit information:

| PDSCH1 decoding result | PDSCH2 decoding result | PDSCH3 decoding result |
| --- | --- | --- |

Example 1-2

Figure 6:
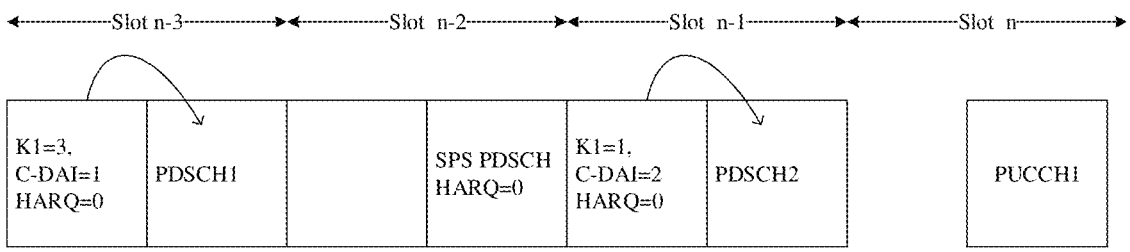

As shown in FIG. 6, if K1 in the DCI received by the terminal device on time slot n-3 is 3, C-DAI=1, and the DCI schedules PDSCH1 transmitted using HARQ process 0; the SPS PDSCH transmitted using HARQ process 0 is received on time slot n-2; K1 in the DCI received on time slot n-1 is 1, C-DAI=2, and the DCI schedules PDSCH2 transmitted using HARQ process 0. Each HARQ feedback timing indication information K1 included in the above DCIs indicates that the feedback time unit is time slot n, and the feedback time unit corresponding to the SPS PDSCH is also time slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

Then when the terminal device generates the HARQ-ACK codebook to be transmitted on slot n (or PUCCH1), the HARQ-ACK codebook includes the following 3-bit information:

| PDSCH1 | PDSCH2 | SPS PDSCH |
| decoding result | decoding result | decoding result |

It should be understood that the number of HARQ processes in the foregoing example is only an example, which is not limited in this application, that is, the terminal device may perform feedback on physical channels transmitted by one or more disabled HARQ processes.

Embodiment 2

The HARQ process 0 of the terminal device corresponds to the disabled state. If the terminal device receives the downlink physical channel transmitted by the network device using the HARQ process in the disabled state, the terminal device should send the HARQ-ACK feedback bit corresponding to the downlink physical channel.

Example 2-1

Figure 7:
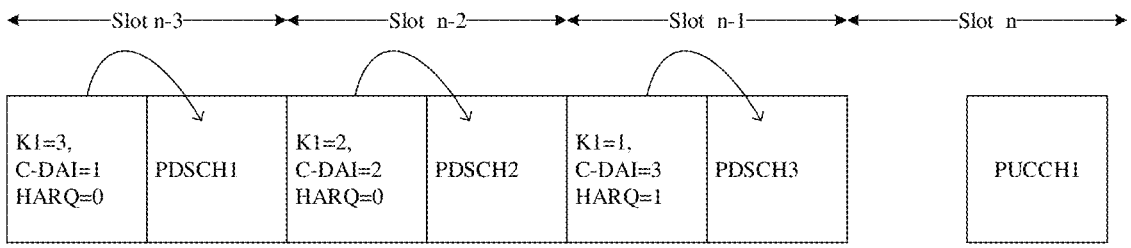

As shown in FIG. 7, HARQ process 0 corresponds to a disabled state, and HARQ process 1 corresponds to an enabled state. If K1 in the DCI received by the terminal device on time slot n-3 is 3, C-DAI=1, and the DCI schedules the PDSCH1 transmitted by HARQ process 0; K1 in the DCI received on time slot n-2 is 2, C-DAI=2, and the DCI schedules the PDSCH2 transmitted by HARQ process 0; K1 in the DCI received on time slot n-1 is 1, C-DAI=3, and the DCI schedules the PDSCH3 transmitted by HARQ process 1. Each HARQ feedback timing indication information K1 included in the above DCIs indicates that the feedback time unit is time slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

Then when the terminal device generates the HARQ-ACK codebook to be transmitted on slot n (or PUCCH1), the HARQ-ACK codebook includes the following 3-bit information:

| PDSCH1 | PDSCH2 | PDSCH3 |
| decoding result | decoding result | decoding result |

That is, in this example, the terminal device may perform unified feedback on physical channels transmitted by the HARQ process in the disabled state and the HARQ process in the enabled state.

Example 2-2

Figure 8:
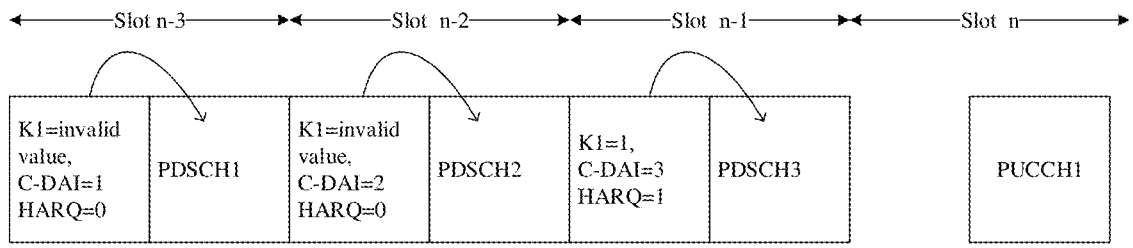

As shown in FIG. 8, HARQ process 0 corresponds to a disabled state, and HARQ process 1 corresponds to an enabled state. If K1 in the DCI received by the terminal device on time slot n-3 is an invalid value, C-DAI=1, and the DCI schedules PDSCH1 transmitted using HARQ process 0; K1 in the DCI received on time slot n-2 is an invalid value, C-DAI=2, and the DCI schedules PDSCH2 transmitted by HARQ process 0; K1 in the DCI received on time slot n-1 is 1, C-DAI=3, and the DCI schedules PDSCH3 transmitted by HARQ process 1.

In this example, since the C-DAI corresponding to the HARQ process in the disabled state is an invalid value, the position of the uplink feedback resource can be determined according to the HARQ feedback timing indication information corresponding to the physical channel to be transmitted later. According to the HARQ feedback timing indication information K1 in the DCI received on the time slot n-1, it may determine that the feedback time unit is time slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

Then when the terminal device generates the HARQ-ACK codebook to be transmitted on slot n (or PUCCH1), the HARQ-ACK codebook includes the following 3-bit information:

| PDSCH1 | PDSCH2 | PDSCH3 |
| decoding result | decoding result | decoding result |

Embodiment 3

The HARQ process 0 of the terminal device corresponds to the disabled state. If the terminal device receives the downlink physical channel transmitted by the network device using the HARQ process 0 in the disabled state, the terminal device does not send the HARQ-ACK feedback bit corresponding to the downlink physical channel.

Example 3-1

Continue to refer to FIG. 7. HARQ process 0 corresponds to a disabled state, and HARQ process 1 corresponds to an enabled state. If K1 in the DCI received by the terminal device on time slot n-3 is 3, C-DAI=1, and the DCI schedules PDSCH1 transmitted by HARQ process 0; K1 in the DCI received on time slot n-2 is 2, C-DAI=2, and the DCI schedules PDSCH2 transmitted by HARQ process 0; K1 in the DCI received on time slot n-1 is 1, C-DAI=3, and the DCI schedules the HARQ process 1 transmitted PDSCH3. Each HARQ feedback timing indication information K1 included in the above DCIs indicates that the feedback time unit is time slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

In another implementation, when the terminal device generates the HARQ-ACK codebook to be transmitted on slot n (or PUCCH1), the HARQ-ACK codebook includes the following 3-bit information, corresponding to the feedback mode 2 mentioned above:

| NACK | NACK | PDSCH3 decoding result |

Example 3-2

Figure 9:
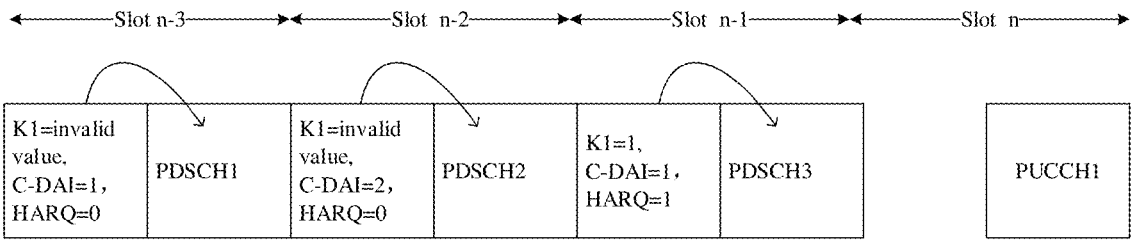

As shown in FIG. 9, the HARQ process 0 of the terminal device corresponds to the disabled state, and the HARQ process 1 corresponds to the enabled state. If K1 in the DCI received by the terminal device on time slot n-3 is an invalid value, C-DAI=1, and the DCI schedules PDSCH1 transmitted using HARQ process 0; K1 in the DCI received on time slot n-2 is an invalid value, C-DAI=2, and the DCI schedules PDSCH2 transmitted by HARQ process 0; K1 in the DCI received on time slot n-1 is 1, C-DAI=1, and the DCI schedules PDSCH3 transmitted by the HARQ process 1, that is, the HARQ feedback timing indication information K1 in the DCI received on the slot n-1 indicates that the feedback time unit is the slot n.

It is assumed that the HARQ-ACK information feedback on the serving cell of the terminal device is based on TB feedback, wherein the maximum number of TB included in one HARQ process is 1, or one HARQ process corresponds to 1 bit of HARQ-ACK information.

Then when the terminal device generates the HARQ-ACK codebook to be transmitted on slot n (or PUCCH1), the HARQ-ACK codebook includes the following 1-bit information:

| PDSCH3 decoding result |
|---|

The above describes a method for feeding back HARQ-ACK according to an embodiment of the present application with reference to FIG. 4 to FIG. 9. Hereinafter, a hybrid automatic repeat request acknowledgment HARQ-ACK feedback method according to another embodiment of the present application is described with reference to FIG. 10. It should be understood that reference may be made to the above for similar descriptions, and details are not repeated here to avoid repetition.

Figure 10:
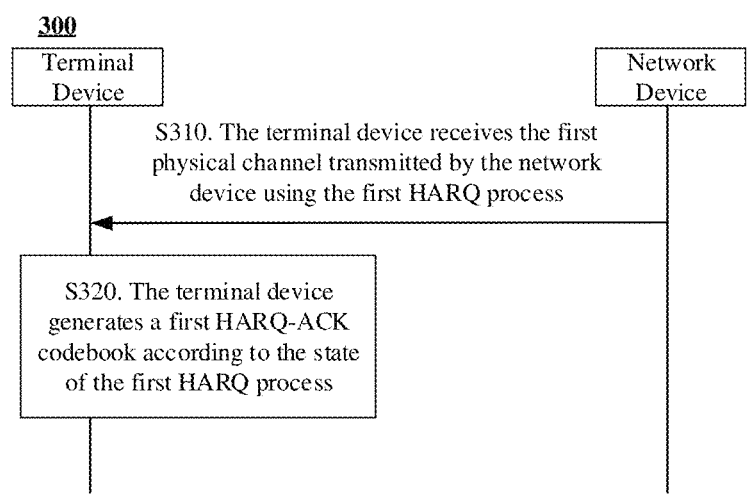
FIG. 10 is a schematic diagram of another hybrid automatic repeat request acknowledgment HARQ-ACK feedback method provided by an embodiment of the present application.

FIG. 10 is a schematic flowchart of a hybrid automatic repeat request acknowledgment HARQ-ACK feedback method 300 according to another embodiment of the present application, and the method 300 can be executed by a terminal device in the communication system shown in FIG. 1A-FIG. 1C, as shown in FIG. 10, the method 300 includes at least part of the following content.

S310. The terminal device receives the first physical channel transmitted by the network device using the first HARQ process;

S320. The terminal device generates a first HARQ-ACK codebook according to the state of the first HARQ process.

Optionally, in some embodiments, the terminal device generating the first HARQ-ACK codebook according to the state of the first HARQ process, including:

If the first HARQ process corresponds to an enabled state, the generated first HARQ-ACK codebook includes the first HARQ-ACK feedback bit corresponding to the first physical channel; or If the first HARQ process corresponds to the disabled state, the generated first HARQ-ACK codebook includes the first HARQ-ACK feedback bit corresponding to the first physical channel, or the first HARQ-ACK codebook does not include the first HARQ-ACK feedback bit corresponding to the first physical channel.

In this embodiment, the terminal device can detect the state of the HARQ process corresponding to the downlink transmission when generating the HARQ-ACK codebook, and further generate an appropriate HARQ-ACK codebook according to the state of the HARQ process, thereby avoiding the ambiguous understanding of the HARQ-ACK feedback codebook between the network device and the terminal device.

It should be understood that content of this embodiment similar to the foregoing embodiments, such as the definition of the enabled state corresponding to the HARQ process and the disabled state corresponding to the HARQ process, the codebook generation method, the feedback method, the counting method, etc., can refer to the relevant descriptions of the foregoing method 200, and thus are omitted here for brevity.

Optionally, in some embodiments, the first HARQ-ACK codebook is generated according to the first downlink allocation index count C-DAI, wherein the first C-DAI is included in the first DCI, and the first DCI is used to schedule the first physical channel.

Optionally, in some embodiments, the first HARQ process corresponds to a disabled state, and the first C-DAI is a ranking value of the first physical channel in the downlink transmission using the HARQ process in the disabled state, or, the first C-DAI is a ranking value of the first physical channel in the downlink transmission using the HARQ processes in the disabled state and the enabled state.

Optionally, in some embodiments, the first HARQ-ACK codebook includes the first HARQ-ACK feedback bit corresponding to the first physical channel; or The first HARQ-ACK codebook includes the HARQ-ACK feedback position corresponding to the first physical channel, and the HARQ-ACK feedback position is set to negative acknowledgment NACK; or The first HARQ-ACK codebook does not include the HARQ-ACK feedback position corresponding to the first physical channel.

Optionally, in some embodiments, the first HARQ process corresponds to an enabled state, and the first C-DAI is the ranking of the first physical channel in downlink transmission using the HARQ process in the enabled state value, or, the first C-DAI is a ranking value of the first physical channel in the downlink transmission using the HARQ processes in the disabled state and the enabled state.

Optionally, in some embodiments, the first HARQ-ACK codebook includes the first HARQ-ACK feedback bit.

Optionally, in some embodiments, the disabled state corresponding to the first HARQ process includes at least one of the following situations:

After the terminal device receives the first physical channel transmitted through the first HARQ process, it does not need to feed back the first HARQ-ACK feedback bit corresponding to the first physical channel;

After the network device transmits the first physical channel through the first HARQ process, it does not expect to receive the first HARQ-ACK feedback bit corresponding to the first physical channel sent by the terminal device;

After the terminal device receives the first physical channel transmitted through the first HARQ process, it does not need to feed back the first HARQ-ACK feedback bit corresponding to the first physical channel according to the first DCI scheduling the first physical channel;

After the network device transmits the first physical channel through the first HARQ process, it does not expect to receive the first HARQ-ACK feedback bit corresponding to the first physical channel according to the first DCI scheduling the first physical channel;

After the terminal device receives the first physical channel transmitted through the first HARQ process, it needs to feed back the first HARQ-ACK feedback bit corresponding to the first physical channel;

After the network device transmits the first physical channel through the first HARQ process, it expects to receive the first HARQ-ACK feedback bit corresponding to the first physical channel;

After the terminal device receives the first physical channel transmitted through the first HARQ process, before sending the first HARQ-ACK feedback bit corresponding to the first physical channel to the network device, the terminal device can receive the downlink transmission scheduled by the network device using the first HARQ process again;

After the network device transmits the first physical channel through the first HARQ process, before receiving the first HARQ-ACK feedback bit corresponding to the first physical channel sent by the terminal device, the network device is able to schedule downlink transmission again by using the first HARQ process;

Within a first period of time after the terminal device receives the first physical channel transmitted through the first HARQ process, the terminal device can again receive the downlink transmission scheduled by the network device using the first HARQ process;

Within a first duration after the network device transmits the first physical channel through the first HARQ process, the network device can use the first HARQ process to schedule downlink transmission again.

Optionally, in some embodiments, the enabling state corresponding to the first HARQ process includes at least one of the following situations:

After the terminal device receives the first physical channel transmitted through the first HARQ process, it needs to feed back the first HARQ-ACK feedback bit corresponding to the first physical channel;

After the network device transmits the first physical channel through the first HARQ process, it expects to receive the first HARQ-ACK feedback bit corresponding to the first physical channel sent by the terminal device;

After receiving the first physical channel transmitted through the first HARQ process, the terminal device needs to feed back the first HARQ-ACK corresponding to the first physical channel according to the first DCI scheduling the first physical channel feedback bit;

After the network device transmits the first physical channel through the first HARQ process, it expects to receive the first HARQ-ACK feedback bit corresponding to the first physical channel according to the first DCI scheduling the first physical channel;

After the terminal device receives the first physical channel transmitted through the first HARQ process, before sending the first HARQ-ACK feedback bit corresponding to the first physical channel to the network device, the terminal device does not expect to receive the downlink transmission scheduled by the network device using the first HARQ process again;

After the network device transmits the first physical channel through the first HARQ process, before receiving the first HARQ-ACK feedback bit corresponding to the first physical channel sent by the terminal device, the network device cannot use the first HARQ process to schedule downlink transmission again;

Within a first duration after the terminal device receives the first physical channel transmitted through the first HARQ process, the terminal device does not expect to receive the downlink scheduled by the network device using the first HARQ process again transmission;

Within a first duration after the network device transmits the first physical channel through the first HARQ process, the network device cannot use the first HARQ process to schedule downlink transmission again.

Optionally, in some embodiments, the first duration is determined according to the round-trip time RTT between the terminal device and the network device; or the first duration is determined according to the position of the uplink feedback resource corresponding to the first physical channel.

Optionally, in some embodiments, the network device being able to use the first HARQ process to schedule downlink transmission again, including:

The network device uses the first HARQ process to schedule a new transmission of a transport block in a downlink transmission; or, The network device schedules a retransmission of a transport block in a downlink transmission by using the first HARQ process.

Optionally, in some embodiments, the first physical channel includes at least one of the following:

The physical downlink shared channel PDSCH scheduled by the physical downlink control channel PDCCH;

PDCCH used for downlink semi-persistent scheduling physical downlink shared channel DL SPS PDSCH release;

PDCCH used to indicate the sleep or non-sleep behavior of the secondary cell;

DL SPS PDSCH without corresponding PDCCH scheduling.

The method embodiment of the present application is described in detail above in conjunction with FIG. 4 to FIG. 10, and the device embodiment of the present application is described in detail below in conjunction with FIG. 11 to FIG. 14. It should be understood that the device embodiment and the method embodiment correspond to each other, and similar description can refer to the method embodiment.

Figure 11:
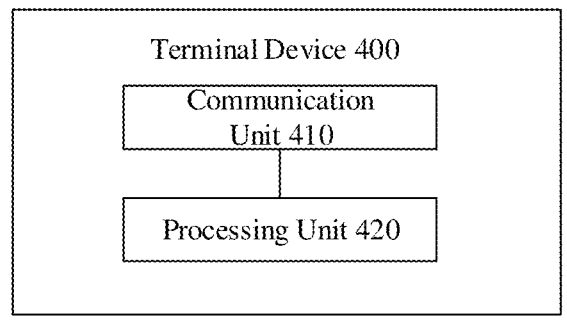
FIG. 11 is a schematic block diagram of a terminal device provided by an embodiment of the present application.

FIG. 11 shows a schematic block diagram of a terminal device 400 according to an embodiment of the present application. As shown in FIG. 11, the terminal device 400 includes:

A communication unit 410, configured to receive a first physical channel transmitted by a network device using a first HARQ process, wherein the first HARQ process corresponds to a disabled state;

A processing unit 420, configured to generate a first HARQ-ACK codebook, wherein the first HARQ-ACK codebook includes first HARQ-ACK feedback bit corresponding to the first physical channel, or the first HARQ-ACK codebook does not include the first HARQ-ACK feedback bit corresponding to the first physical channel.

Optionally, in some embodiments, the communication unit 410 is further configured to:

Send the first HARQ-ACK codebook to the network device by using the first uplink feedback resource.

Optionally, in some embodiments, the first uplink feedback resource is determined according to first HARQ feedback timing indication information, wherein the first HARQ feedback timing indication information indicates a valid value, and the first HARQ feedback timing indication information is included in the first downlink control information DCI, and the first DCI is used to schedule the first physical channel; or, The first uplink feedback resource is determined according to the HARQ feedback timing set configured by the network device.

Optionally, in some embodiments, the first uplink feedback resource is determined according to the second HARQ feedback timing indication information, wherein the first HARQ feedback timing indication information indicates an invalid value, and the first HARQ feedback timing indication information is included in the first DCI, the first DCI is used to schedule the first physical channel, the second HARQ feedback timing indication information is included in the second DCI, and the second DCI is used to schedule the second physical channel, wherein The second physical channel is transmitted after the first physical channel, or the second physical downlink control channel PDCCH monitoring opportunity when the terminal device detects the second DCI is later than the PDCCH monitoring opportunity when the terminal device detects the first DCI.

Optionally, in some embodiments, the second physical channel includes a first one of physical channel whose corresponding HARQ feedback timing indication information is a valid value after the transmission of the first physical channel; or The second DCI includes the first one of DCI whose corresponding HARQ feedback timing indication information detected by the terminal device after the first DCI is a valid value.

Optionally, in some embodiments, the first HARQ-ACK codebook is generated according to the first downlink allocation index count C-DAI, where the first C-DAI is included in the first DCI, and the first DCI is used to schedule the first physical channel.

Optionally, in some embodiments, the first C-DAI is a ranking value of the first physical channel in downlink transmission using a HARQ process in a disabled state.

Optionally, in some embodiments, the first HARQ-ACK codebook includes the HARQ-ACK feedback position corresponding to the first physical channel, and the HARQ-ACK feedback position corresponding to the first physical channel is negative acknowledgment NACK; or The first HARQ-ACK codebook does not include the HARQ-ACK feedback position corresponding to the first physical channel.

Optionally, in some embodiments, the first C-DAI is a ranking value of the first physical channel in downlink transmission using HARQ processes in a disabled state and an enabled state.

Optionally, in some embodiments, the first HARQ-ACK codebook includes the first HARQ-ACK feedback bit; or, The first HARQ-ACK codebook includes the HARQ-ACK feedback position corresponding to the first physical channel, and the HARQ-ACK feedback position corresponding to the first physical channel is NACK.

Optionally, in some embodiments, the communication unit 410 is further configured to:

receive a second physical channel transmitted by the network device using a second HARQ process, where the second HARQ process corresponds to an enabled state.

Optionally, in some embodiments, the processing unit 420 is further configured to:

The terminal device generates the first HARQ-ACK codebook according to the decoding result of the second physical channel, wherein the first HARQ-ACK codebook includes a second HARQ-ACK feedback bit corresponding to the second physical channel.

Optionally, in some embodiments, the first HARQ-ACK codebook is generated according to the first C-DAI and the second C-DAI, the first C-DAI is included in the first DCI, and the first DCI is used to schedule the first physical channel, the second C-DAI is included in the second DCI, and the second DCI is used to schedule the second physical channel, wherein the first C-DAI is the ranking value corresponding to the first physical channel, and the second C-DAI is the ranking value corresponding to the second physical channel.

Optionally, in some embodiments, the first C-DAI is a ranking value of the first physical channel in the downlink transmission using the HARQ processes in the disabled state and the enabled state;

The second C-DAI is a ranking value of the second physical channel in downlink transmission using HARQ processes in a disabled state and an enabled state.

Optionally, in some embodiments, the first HARQ-ACK codebook includes the first HARQ-ACK feedback bit and the second HARQ-ACK feedback bit; or The first HARQ-ACK codebook includes second HARQ-ACK feedback bit, and the HARQ-ACK feedback position corresponding to the first physical channel is NACK.

Optionally, in some embodiments, the first HARQ-ACK codebook is generated according to the second C-DAI, the second C-DAI is included in the second DCI, and the second DCI is used to schedule the second physical channel, wherein the second C-DAI is a ranking value corresponding to the second physical channel.

Optionally, in some embodiments, the second C-DAI is a ranking value of the second physical channel in downlink transmission using an enabled HARQ process;

The first DCI used to schedule the first physical channel includes a first C-DAI, and the first C-DAI is a ranking value of the first physical channel in the downlink transmission using a HARQ process in a disabled state, or the first DCI does not include the first C-DAI.

Optionally, in some embodiments, the first HARQ-ACK codebook only includes the second HARQ-ACK feedback bit; or, The first HARQ-ACK codebook includes second HARQ-ACK feedback bit, and the HARQ-ACK feedback position corresponding to the first physical channel is NACK.

Optionally, in some embodiments, the disabled state corresponding to the first HARQ process includes at least one of the following situations:

After the terminal device receives the first physical channel transmitted through the first HARQ process, it does not need to feed back the first HARQ-ACK feedback bit corresponding to the first physical channel;

After the network device transmits the first physical channel through the first HARQ process, it does not expect to receive the first HARQ-ACK feedback bit corresponding to the first physical channel sent by the terminal device;

After the terminal device receives the first physical channel transmitted through the first HARQ process, it does not need to feed back the first HARQ-ACK feedback bit corresponding to the first physical channel according to the first DCI scheduling the first physical channel;

After the network device transmits the first physical channel through the first HARQ process, it does not expect to receive the first HARQ-ACK feedback bit corresponding to the first physical channel according to the first DCI scheduling the first physical channel;

After the terminal device receives the first physical channel transmitted through the first HARQ process, it needs to feed back the first HARQ-ACK feedback bit corresponding to the first physical channel;

After the network device transmits the first physical channel through the first HARQ process, it expects to receive the first HARQ-ACK feedback bit corresponding to the first physical channel;

After the terminal device receives the first physical channel transmitted through the first HARQ process, before sending the first HARQ-ACK feedback bit corresponding to the first physical channel to the network device, the terminal device can receive the downlink transmission scheduled by the network device using the first HARQ process again;

After the network device transmits the first physical channel through the first HARQ process, before receiving the first HARQ-ACK feedback bit corresponding to the first physical channel sent by the terminal device, the network device being able to schedule downlink transmission again by using the first HARQ process;

Within a first period of time after the terminal device receives the first physical channel transmitted through the first HARQ process, the terminal device can again receive the downlink transmission scheduled by the network device using the first HARQ process;

Within a first duration after the network device transmits the first physical channel through the first HARQ process, the network device can use the first HARQ process to schedule downlink transmission again.

Optionally, in some embodiments, the first duration is determined according to the round-trip time RTT between the terminal device and the network device; or the first duration is determined according to the position of the uplink feedback resource corresponding to the first physical channel.

Optionally, in some embodiments, the network device being able to use the first HARQ process to schedule downlink transmission again, including:

The network device uses the first HARQ process to schedule a new transmission of a transport block in a downlink transmission; or, The network device schedules a retransmission of a transport block in a downlink transmission by using the first HARQ process.

Optionally, in some embodiments, the first physical channel includes at least one of the following:

The physical downlink shared channel PDSCH scheduled by the physical downlink control channel PDCCH;

The PDSCH used for downlink semi-persistent scheduling physical downlink shared channel DL SPS PDSCH release;

The PDCCH used to indicate the sleep or non-sleep behavior of the secondary cell;

The DL SPS PDSCH without corresponding PDCCH scheduling.

Optionally, in some embodiments, the processing unit 420 is specifically configured to:

If the first HARQ feedback timing indication information indicates an invalid value, or the first C-DAI indicates a preset value, the generated first HARQ-ACK codebook does not include the first HARQ-ACK feedback bit;

Wherein, the first C-DAI is included in a first DCI, and the first DCI is used to schedule the first physical channel.

Optionally, in some embodiments, the above-mentioned communication unit may be a communication interface or a transceiver, or an input-output interface of a communication chip or a system-on-chip. The aforementioned processing unit may be one or more processors.

It should be understood that the terminal device 400 according to the embodiment of the present application may correspond to the terminal device in the method embodiment of the present application, and the above-mentioned and other operations and/or functions of each unit in the terminal device 400 are respectively to realize the corresponding process of the terminal device in the method 200 shown in FIG. 4 to FIG. 9, which will not be repeated here for brevity.

Figure 12:
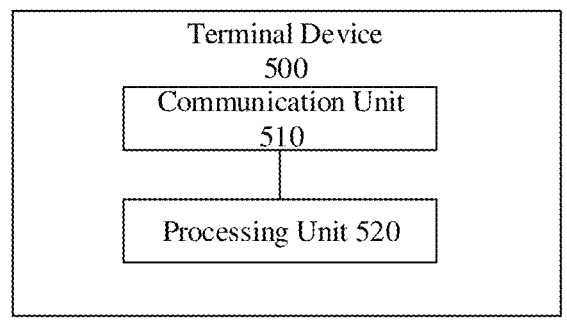
FIG. 12 is a schematic block diagram of a terminal device provided by an embodiment of the present application.

FIG. 12 shows a schematic block diagram of a terminal device 500 according to an embodiment of the present application. As shown in FIG. 12, the terminal device 500 includes:

A communication unit 510, configured to receive the first physical channel transmitted by the network device using a first HARQ process;

A processing unit 520, configured to generate a first HARQ-ACK codebook according to the state of the first HARQ process.

Optionally, in some embodiments, the processing unit 520 is specifically configured to:

If the first HARQ process corresponds to an enabled state, the generated first HARQ-ACK codebook includes the first HARQ-ACK feedback bit corresponding to the first physical channel; or If the first HARQ process corresponds to the disabled state, the generated first HARQ-ACK codebook includes the first HARQ-ACK feedback bit corresponding to the first physical channel, or the first HARQ-ACK codebook does not include the first HARQ-ACK feedback bit corresponding to the first physical channel.

Optionally, the first HARQ-ACK codebook is generated according to a first downlink assignment index count C-DAI, wherein the first C-DAI is included in a first DCI, and the first DCI is used for scheduling the first physical channel.

Optionally, in some embodiments, the first HARQ process corresponds to a disabled state, and the first C-DAI is a ranking value of the first physical channel in the downlink transmission using the HARQ process in the disabled state. Or, the first C-DAI is a ranking value of the first physical channel in the downlink transmission using the HARQ processes in the disabled state and the enabled state.

Optionally, in some embodiments, the first HARQ-ACK codebook includes the first HARQ-ACK feedback bit corresponding to the first physical channel; or The first HARQ-ACK codebook includes the HARQ-ACK feedback position corresponding to the first physical channel, and the HARQ-ACK feedback position is a negative acknowledgment NACK; or The first HARQ-ACK codebook does not include the HARQ-ACK feedback position corresponding to the first physical channel.

Optionally, the first HARQ process corresponds to an enabled state, and the first C-DAI is a ranking value of the first physical channel in downlink transmission using the HARQ process in the enabled state, or, the first C-DAI A C-DAI is a ranking value of the first physical channel in the downlink transmission using the HARQ processes in the disabled state and the enabled state.

Optionally, the first HARQ-ACK codebook includes the first HARQ-ACK feedback bit.

Optionally, the disabled state corresponding to the first HARQ process includes at least one of the following situations:

After the terminal device receives the first physical channel transmitted through the first HARQ process, it does not need to feed back the first HARQ-ACK feedback bit corresponding to the first physical channel;

After the network device transmits the first physical channel through the first HARQ process, it does not expect to receive the first HARQ-ACK feedback bit corresponding to the first physical channel sent by the terminal device;

After the terminal device receives the first physical channel transmitted through the first HARQ process, it does not need to feed back the first HARQ-ACK feedback bit corresponding to the first physical channel according to the first DCI scheduling the first physical channel;

After the network device transmits the first physical channel through the first HARQ process, it does not expect to receive the first HARQ-ACK feedback bit corresponding to the first physical channel according to the first DCI scheduling the first physical channel;

After the terminal device receives the first physical channel transmitted through the first HARQ process, it needs to feed back the first HARQ-ACK feedback bit corresponding to the first physical channel;

After the network device transmits the first physical channel through the first HARQ process, it expects to receive the first HARQ-ACK feedback bit corresponding to the first physical channel;

After the terminal device receives the first physical channel transmitted through the first HARQ process, before sending the first HARQ-ACK feedback bit corresponding to the first physical channel to the network device, the terminal device can receive the downlink transmission scheduled by the network device using the first HARQ process again;

After the network device transmits the first physical channel through the first HARQ process, before receiving the first HARQ-ACK feedback bit corresponding to the first physical channel sent by the terminal device, the network device being able to schedule downlink transmission again by using the first HARQ process;

Within a first period of time after the terminal device receives the first physical channel transmitted through the first HARQ process, the terminal device can again receive the downlink transmission scheduled by the network device using the first HARQ process;

Within a first duration after the network device transmits the first physical channel through the first HARQ process, the network device can use the first HARQ process to schedule downlink transmission again.

Optionally, the enabling state corresponding to the first HARQ process includes at least one of the following situations:

After the terminal device receives the first physical channel transmitted through the first HARQ process, it needs to feed back the first HARQ-ACK feedback bit corresponding to the first physical channel;

After the network device transmits the first physical channel through the first HARQ process, it expects to receive the first HARQ-ACK feedback bit corresponding to the first physical channel sent by the terminal device;

After receiving the first physical channel transmitted through the first HARQ process, the terminal device needs to feed back the first HARQ-ACK corresponding to the first physical channel according to the first DCI scheduling the first physical channel feedback bit;

After the network device transmits the first physical channel through the first HARQ process, it expects to receive the first HARQ-ACK feedback bit corresponding to the first physical channel according to the first DCI scheduling the first physical channel;

After the terminal device receives the first physical channel transmitted through the first HARQ process, before sending the first HARQ-ACK feedback bit corresponding to the first physical channel to the network device, the terminal device does not capable of receiving again the downlink transmission scheduled by the network device using the first HARQ process;

After the network device transmits the first physical channel through the first HARQ process, before receiving the first HARQ-ACK feedback bit corresponding to the first physical channel sent by the terminal device, the network device cannot use the first HARQ process to schedule downlink transmission again;

Within a first period of time after the terminal device receives the first physical channel transmitted through the first HARQ process, the terminal device cannot receive the downlink scheduled by the network device using the first HARQ process again transmission;

Within a first duration after the network device transmits the first physical channel through the first HARQ process, the network device cannot use the first HARQ process to schedule downlink transmission again.

Optionally, in some embodiments, the first duration is determined according to the round-trip time RTT between the terminal device and the network device; or the first duration is determined according to the position of the uplink feedback resource corresponding to the first physical channel.

Optionally, in some embodiments, the network device being able to use the first HARQ process to schedule downlink transmission again, including:

The network device uses the first HARQ process to schedule a new transmission of a transport block in a downlink transmission; or, The network device schedules a retransmission of a transport block in a downlink transmission by using the first HARQ process.

Optionally, in some embodiments, the first physical channel includes at least one of the following:

The physical downlink shared channel PDSCH scheduled by the physical downlink control channel PDCCH;

The PDCCH used for downlink semi-persistent scheduling physical downlink shared channel DL SPS PDSCH release;

The PDCCH used to indicate the sleep or non-sleep behavior of the secondary cell;

The DL SPS PDSCH without corresponding PDCCH scheduling.

Optionally, in some embodiments, the above-mentioned communication unit may be a communication interface or a transceiver, or an input-output interface of a communication chip or a system-on-chip. The aforementioned processing unit may be one or more processors.

It should be understood that the terminal device 500 according to the embodiment of the present application may correspond to the terminal device in the method embodiment of the present application, and the above-mentioned and other operations and/or functions of each unit in the terminal device 500 are to realize the method 300 shown in FIG. 10. For the sake of brevity, the corresponding process of the terminal device in the method 300 will not be repeated here.

Figure 13:
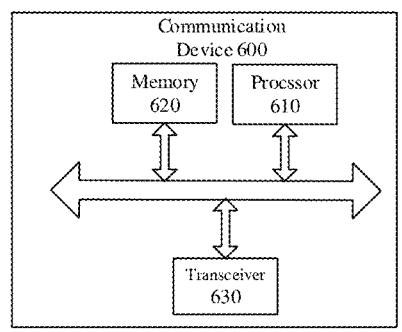
FIG. 13 is a schematic block diagram of a communication device provided by another embodiment of the present application.

FIG. 13 is a schematic structural diagram of a communication device 600 provided by an embodiment of the present application. The communication device 600 shown in FIG. 13 includes a processor 610, and the processor 610 can call and run a computer program from a memory, so as to implement the method in the embodiment of the present application.

Optionally, as shown in FIG. 13, the communication device 600 may further include a memory 620. Wherein, the processor 610 can invoke and run a computer program from the memory 620, so as to implement the method in the embodiment of the present application.

Wherein, the memory 620 may be an independent device independent of the processor 610, or may be integrated in the processor 610.

Optionally, as shown in FIG. 13, the communication device 600 may further include a transceiver 630, and the processor 610 may control the transceiver 630 to communicate with other devices, specifically, to send information or data to other devices, or receive other Information or data sent by the device.

Wherein, the transceiver 630 may include a transmitter and a receiver. The transceiver 630 may further include antennas, and the number of antennas may be one or more.

Optionally, the communication device 600 may specifically be the network device of the embodiment of the present application, and the communication device 600 may implement the corresponding processes implemented by the network device in each method of the embodiment of the present application. For the sake of brevity, details are not repeated here.

Optionally, the communication device 600 may specifically be the mobile terminal/terminal device of the embodiment of the present application, and the communication device 600 may implement the corresponding processes implemented by the mobile terminal/terminal device in each method of the embodiment of the present application, for the sake of brevity, details are not repeated here.

Figure 14:
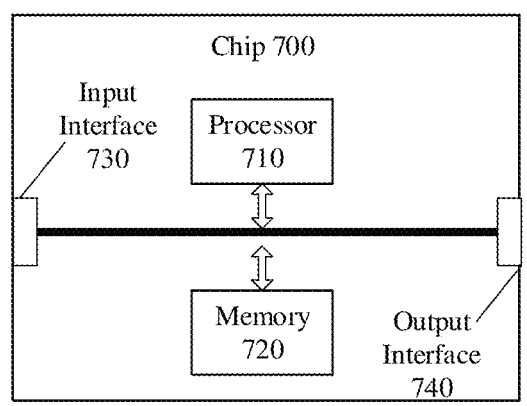
FIG. 14 is a schematic block diagram of a chip provided by an embodiment of the present application.

FIG. 14 is a schematic structural diagram of a chip according to an embodiment of the present application. The chip 700 shown in FIG. 14 includes a processor 710, and the processor 710 can call and run a computer program from a memory, so as to implement the method in the embodiment of the present application.

Optionally, as shown in FIG. 14, the chip 700 may further include a memory 720. Wherein, the processor 710 can invoke and run a computer program from the memory 720, so as to implement the method in the embodiment of the present application.

Wherein, the memory 720 may be an independent device independent of the processor 710, or may be integrated in the processor 710.

Optionally, the chip 700 may also include an input interface 730. Wherein, the processor 710 can control the input interface 730 to communicate with other devices or chips, specifically, can obtain information or data sent by other devices or chips.

Optionally, the chip 700 may also include an output interface 740. Wherein, the processor 710 can control the output interface 740 to communicate with other devices or chips, specifically, can output information or data to other devices or chips.

Optionally, the chip can be applied to the network device in the embodiment of the present application, and the chip can implement the corresponding processes implemented by the network device in the methods of the embodiment of the present application. For the sake of brevity, details are not repeated here.

Optionally, the chip can be applied to the mobile terminal/terminal device in the embodiments of the present application, and the chip can implement the corresponding processes implemented by the mobile terminal/terminal device in the various methods of the embodiments of the present application. For the sake of brevity, details are not repeated here.

It should be understood that the chip mentioned in the embodiment of the present application may also be called a system-on-chip, a system-on-chip, a system-on-a-chip, or a system-on-a-chip.

It should be understood that the processor in the embodiment of the present application may be an integrated circuit chip, which has a signal processing capability. In the implementation process, each step of the above-mentioned method embodiments may be completed by an integrated logic circuit of hardware in a processor or instructions in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, discrete hardware components. Various methods, steps, and logic block diagrams disclosed in the embodiments of the present application may be implemented or executed. A general-purpose processor may be a microprocessor, or the processor may be any conventional processor, or the like. The steps of the method disclosed in connection with the embodiments of the present application may be directly implemented by a hardware decoding processor, or implemented by a combination of hardware and software modules in the decoding processor. The software module can be located in a mature storage medium in the field such as random access memory, flash memory, read-only memory, programmable read-only memory or electrically erasable programmable memory, and register. The storage medium is located in the memory, and the processor reads the information in the memory, and completes the steps of the above method in combination with its hardware.

It can be understood that the memory in the embodiments of the present application may be a volatile memory or a nonvolatile memory, or may include both volatile and non-volatile memories. Among them, the non-volatile memory can be read-only memory (ROM), programmable read-only memory (PROM), erasable programmable read-only memory (Erasable PROM, EPROM), electrically programmable Erase Programmable Read-Only Memory (Electrically EPROM, EEPROM) or Flash. The volatile memory may be Random Access Memory (RAM), which acts as an external cache. By way of illustration and not limitation, many forms of RAM are available such as Static RAM (SRAM), Dynamic RAM (DRAM), Synchronous DRAM (SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Synchlink DRAM, SLDRAM) and Direct Memory Bus Random Access Memory (Direct Rambus RAM, DR RAM). It should be noted that the memory of the systems and methods described herein is intended to include, but not be limited to, these and any other suitable types of memory.

It should be understood that the above-mentioned memory is illustrative but not restrictive. For example, the memory in the embodiment of the present application may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memory in the embodiments of the present application is intended to include, but not be limited to, these and any other suitable types of memory.

The embodiment of the present application also provides a computer-readable storage medium for storing computer programs.

Optionally, the computer-readable storage medium can be applied to the network device in the embodiments of the present application, and the computer program enables the computer to execute the corresponding processes implemented by the network device in the methods of the embodiments of the present application. For brevity, it will not be repeated herein.

Optionally, the computer-readable storage medium can be applied to the mobile terminal/terminal device in the embodiments of the present application, and the computer program enables the computer to execute the corresponding processes implemented by the mobile terminal/terminal device in the various methods of the embodiments of the present application, for the sake of brevity, it is not repeated here.

The embodiment of the present application also provides a computer program product, including computer program instructions.

Optionally, the computer program product may be applied to the network device in the embodiment of the present application, and the computer program instructions cause the computer to execute the corresponding process implemented by the network device in each method of the embodiment of the present application. For the sake of brevity, the details are not repeated here.

Optionally, the computer program product can be applied to the mobile terminal/terminal device in the embodiments of the present application, and the computer program instructions cause the computer to execute the corresponding processes implemented by the mobile terminal/terminal device in the methods of the embodiments of the present application, For the sake of brevity, details are not repeated here.

The embodiment of the present application also provides a computer program.

Optionally, the computer program can be applied to the network device in the embodiment of the present application. When the computer program is run on the computer, the computer executes the corresponding process implemented by the network device in each method of the embodiment of the present application. For the sake of brevity, it will not be repeated here.

Optionally, the computer program can be applied to the mobile terminal/terminal device in the embodiment of the present application. When the computer program is run on the computer, the computer executes each method in the embodiment of the present application to be implemented by the mobile terminal/terminal device. For the sake of brevity, the corresponding process will not be repeated here.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may use different methods to implement the described functions for each specific application, but such implementation should not be regarded as exceeding the scope of the present application.

Those skilled in the art can clearly understand that for the convenience and brevity of the description, the specific operating process of the above-described system, device and unit can refer to the corresponding process in the foregoing method embodiment, which will not be repeated here.

In the several embodiments provided in this application, it should be understood that the disclosed systems, devices and methods may be implemented in other ways. For example, the device embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present application may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the technical solution of the present application is essentially or the part that contributes to the prior art or the part of the technical solution can be embodied in the form of a software product, and the computer software product is stored in a storage medium, including several instructions that are used to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disk or optical disk and other media that can store program codes.

The above is only a specific implementation of the application, but the scope of protection of the application is not limited thereto. Anyone familiar with the technical field can easily think of changes or substitutions within the technical scope disclosed in the application. Should be covered within the protection scope of this application. Therefore, the protection scope of the present application should be based on the protection scope of the claims.

What is claimed is:

1. A feedback method for hybrid automatic repeat request response hybrid automatic repeat request-acknowledgement (HARQ-ACK), comprising:
  receiving, by a terminal device, first physical channel transmitted by a network device using a first hybrid automatic repeat request-acknowledgement (HARQ) process corresponding to a disabled state; and generating, by the terminal device, a first HARQ-ACK codebook, wherein the first HARQ-ACK codebook comprises a first HARQ-ACK feedback bit corresponding to the first physical channel,
wherein the first HARQ-ACK feedback bit comprises acknowledgement (ACK) information or negative acknowledgement (NACK) information corresponding to decoding result of the first physical channel, and
the first physical channel comprises a physical downlink control channel (PDSCH) transmission for downlink (DL) Semi-Persistent Scheduling (SPS) activation.

2. The method according to claim 1, further comprising:
transmitting, by the terminal device, the first HARQ-ACK codebook to the network device by using a first uplink feedback resource.

3. The method according to claim 2, wherein the first uplink feedback resource is determined according to first HARQ feedback timing indication information, wherein the first HARQ feedback timing indication information indicates a valid value, and the first HARQ feedback timing indication information is comprised in first downlink control information (DCI), and the first DCI is used to schedule the first physical channel; or,
the first uplink feedback resource is determined according to an HARQ feedback timing set configured by the network device.

4. The method according to claim 1, further comprising:
receiving, by the terminal device, a second physical channel transmitted by the network device using a second HARQ process corresponding to an enabled state.

5. The method according to claim 4, wherein generating the first HARQ-ACK codebook by the terminal device comprises:
generating, by the terminal device, the first HARQ-ACK codebook according to a decoding result of the second physical channel, wherein the first HARQ-ACK codebook comprises a second HARQ-ACK feedback bit corresponding to the second physical channel.

6. The method according to claim 5, wherein:
a first DCI scheduling the first physical channel comprises a first counter-downlink assignment index (C-DAI), wherein the first C-DAI corresponds to C-DAIs in disabled state, and the first C-DAI is not counted; and
a second downlink control information (DCI) scheduling the second physical channel comprises a second C-DAI, wherein the second C-DAI corresponds to C-DAIs in enabled state, and the second C-DAI is counted.

7. The method according to claim 5, wherein
a first downlink control information (DCI) scheduling the first physical channel comprises a first total-downlink assignment index (T-DAI), wherein the first T-DAI corresponds to T-DAIs in disabled state, and the first T-DAI is not counted; and
a second DCI scheduling the second physical channel comprises a second T-DAI, wherein the second T-DAI corresponds to T-DAIs in enabled state, and the second T-DAI is counted.

8. The method according to claim 5, wherein the first HARQ-ACK codebook is generated according to a second counter-downlink assignment index (C-DAI), the second C-DAI is comprised in a second downlink control information (DCI), and the second DCI is used to schedule the second physical channel, wherein the second C-DAI is a ranking value corresponding to the second physical channel.

9. The method according to claim 1, wherein the first physical channel comprises at least one of the following:
physical downlink shared channel (PDSCH) scheduled by the physical downlink control channel (PDCCH);
PDCCH used for downlink semi-persistent scheduling (DL SPS) physical downlink shared channel (PDSCH) release;
PDCCH used to indicate sleep or non-sleep behavior of a secondary cell; and
DL SPS PDSCH without corresponding PDCCH scheduling.

10. A hybrid automatic repeat request response hybrid automatic repeat request-acknowledgement (HARQ-ACK) feedback method, comprising:
receiving, by a terminal device, first physical channel transmitted by a network device using a first hybrid automatic repeat request-acknowledgement (HARQ) process; and
generating, by the terminal device, a first HARQ-ACK codebook according to a state of the first HARQ process,
wherein the terminal device generating the first HARQ-ACK codebook according to the state of the first HARQ process comprising: in a case that the first HARQ process corresponds to an enabled state, the generated first HARQ-ACK codebook comprises a first HARQ-ACK feedback bit corresponding to the first physical channel; or in a case that the first HARQ process corresponds to a disabled state, the generated first HARQ-ACK codebook comprises the first HARQ-ACK feedback bit corresponding to the first physical channel, or the first HARQ-ACK codebook does not comprise the first HARQ-ACK feedback bit corresponding to the first physical channel; and
wherein the first HARQ process corresponds to the enabled state, and the first counter-downlink assignment index (C-DAI) is a ranking value of the first physical channel in downlink transmissions using HARQ process in the enabled state, or, the first C-DAI is a ranking value of the first physical channel in downlink transmissions using HARQ processes in the disabled state and the enabled state.

11. The method according to claim 10, wherein the first HARQ process corresponds to the enabled state, and the first C-DAI is a ranking value of the first physical channel in downlink transmissions using HARQ process in the enabled state, or, the first C-DAI is a ranking value of the first physical channel in downlink transmissions using HARQ processes in the disabled state and the enabled state.

12. The method according to claim 11, wherein the first HARQ-ACK codebook comprises the first HARQ-ACK feedback bit.

13. The method according to claim 10, wherein the first physical channel comprises at least one of the following:
physical downlink shared channel (PDSCH) scheduled by the physical downlink control channel (PDCCH);
PDCCH used for downlink semi-persistent scheduling (DL SPS) physical downlink shared channel (PDSCH) release;
PDCCH used to indicate sleep or non-sleep behavior of a secondary cell; and
DL SPS PDSCH without corresponding PDCCH scheduling.

14. A terminal device, comprising: a processor and a memory, the memory is used to store a computer program, and the processor is used to invoke and run the computer program stored in the memory, and perform:

receive first physical channel transmitted by a network device using a first hybrid automatic repeat request-acknowledgement (HARQ) process corresponding to a disabled state; and generate a first hybrid automatic repeat request-acknowledgement (HARQ-ACK) codebook, wherein the first HARQ-ACK codebook comprises a first HARQ-ACK feedback bit corresponding to the first physical channel, wherein the first HARQ-ACK feedback bit comprises acknowledgement (ACK) information or negative acknowledgement (NACK) information corresponding to decoding result of the first physical channel, and the first physical channel comprises a physical downlink control channel (PDSCH) transmission for downlink (DL) Semi-Persistent Scheduling (SPS) activation.

\* \* \* \* \*